US008527137B2

(12) United States Patent
Sakakibara

(10) Patent No.: US 8,527,137 B2
(45) Date of Patent: Sep. 3, 2013

(54) VEHICLE BEHAVIOR DATA RECORDING CONTROL SYSTEM AND RECORDING APPARATUS

(75) Inventor: Tadaaki Sakakibara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/433,501

(22) Filed: Mar. 29, 2012

(65) Prior Publication Data

US 2012/0253586 A1 Oct. 4, 2012

(30) Foreign Application Priority Data

Mar. 31, 2011 (JP) .................................. 2011-78573

(51) Int. Cl.
*G01M 17/00* (2006.01)
*F02P 5/00* (2006.01)
*B25J 9/16* (2006.01)

(52) U.S. Cl.
USPC .................... 701/29.2; 701/32.2; 123/406.13; 318/568.1

(58) Field of Classification Search
USPC ............. 701/29.1, 29.2, 32.2, 33.3; 340/435, 340/436; 123/406.13, 479; 386/210
See application file for complete search history.

(56) References Cited

U.S. PATENT DOCUMENTS

| | | | | |
|---|---|---|---|---|
| 6,373,217 | B1 * | 4/2002 | Kawada et al. | 318/564 |
| 7,079,927 | B1 | 7/2006 | Tano et al. | |
| 2003/0183194 | A1 * | 10/2003 | Noguchi | 123/396 |
| 2008/0255721 | A1 * | 10/2008 | Yamada | 701/33 |
| 2009/0037044 | A1 | 2/2009 | Enomoto et al. | |
| 2010/0061700 | A1 * | 3/2010 | Morimoto et al. | 386/95 |

FOREIGN PATENT DOCUMENTS

| | | |
|---|---|---|
| JP | 10-201002 | 7/1998 |
| JP | 2004-318912 | 11/2004 |

* cited by examiner

*Primary Examiner* — Muhammad Shafi
(74) *Attorney, Agent, or Firm* — Nixon & Vanderhye PC

(57) ABSTRACT

A vehicle behavior data recording control system is disclosed. The system comprises a vehicle abnormality detector for detecting a vehicle abnormality and a recorder for acquiring vehicle abnormality information from the vehicle abnormality detector. In response to occurrence of an unexpected behavior, the recorder determines whether or not a cause of the unexpected behavior is the vehicle abnormality. When the cause of the unexpected behavior is the vehicle abnormality, the recorder is prohibited from recording a behavior data relating to the unexpected behavior. When the cause of the unexpected behavior is not the vehicle abnormality, the recorder records the behavior data relating to the unexpected behavior in the memory as an unexpected behavior data.

18 Claims, 14 Drawing Sheets

| DTC TYPE | FCp |
|---|---|
| FIRST GROUP (QUICK RESPONSE) | 2% |
| SECOND GROUP (MIDDLE) | 15% |
| THIRD GROUP (LATE) | 50% |

VEHICLE BEHAVIOR DATA RECORDING CONTROL SYSTEM AND RECORDING APPARATUS

CROSS REFERENCE TO RELATED APPLICATION

The present application is based on and claims priority to Japanese Patent Application No. 2011-78573 filed on Mar. 31, 2011, disclosure of which is incorporated herein by reference.

TECHNICAL FIELD

The present disclosure relates to a vehicle behavior data recording control system and a recording apparatus for recording an "unexpected behavior data".

BACKGROUND

There is a technique for a vehicle to record a behavior data in a memory in response to detecting an abnormal vehicle behavior, so that the recorded behavior data indicates the vehicle behavior at that time and may include vehicle information and control information. The behavior data is used in ex-post analysis (see JP-A-2000-185676 corresponding to U.S. Pat. No. 7,079,927).

In this relation, the inventor of the present application has found out the following. A system may be configured as follows. When a behavior data satisfies a predetermined condition, a record control device alone determines that an abnormal behavior (a behavior of unidentified cause) has occurred. In this configuration, even if the behavior data causing the determination of the abnormal behavior comes from a vehicle abnormality and a resultant driver's abnormal operation, the behavior data is recorded in the memory as "an unexpected behavior data" although a cause of the behavior is clear. An example is as follows. A condition for the recording device to determine an abnormal behavior is that the acceleration exceeds a predetermined threshold. If a tachometer fails and indicates zero rotation speed, the driver may press down an accelerator pedal and the acceleration may exceed the predetermined threshold. In this case, although this sharp acceleration increase behavior is attributed to the failure of the tachometer, the recording device determines that this sharp acceleration increase behavior is an expected behavior of unknown cause. In general, a memory has a finite memory capacity. Thus, if a behavior data resulting from a vehicle abnormality is recorded, a capacity for storing "unexpected behavior data" is reduced. It should be noted that a behavior data to be recorded is the unexpected behavior data, and that the unexpected behavior data refers to a behavior data whose cause is difficult to be identified.

SUMMARY

It is an object of the present disclosure to provide a vehicle behavior data recording control system and a recording apparatus that can improve unexpected behavior determination accuracy.

According to a first example of the present disclosure, a vehicle behavior data recording control system is provided. The system comprises a recording apparatus and a vehicle abnormality detection apparatus connected with the recording apparatus via an in-vehicle network to enable data exchange with the recording apparatus. The vehicle abnormality detection apparatus detects a vehicle abnormality and transmits vehicle abnormality information to the in-vehicle network. The recording apparatus acquires the vehicle abnormality information from the vehicle abnormality detection apparatus via the in-vehicle network and acquires a vehicle behavior data via the in-vehicle network. The recording apparatus includes a memory, a behavior determination section, a vehicle abnormality influence determination section, and a record control section. The behavior determination section determines an occurrence of an unexpected behavior based on the acquired behavior data. In response to the occurrence of the unexpected behavior determined by the behavior determination section, the vehicle abnormality influence determination section determines whether or not a cause of the occurrence of the unexpected behavior is the vehicle abnormality. When a time of the occurrence of the unexpected behavior satisfies a predetermined timing condition with respect to a time of acquiring the vehicle abnormality information, the vehicle abnormality influence determination section determines that the cause of the occurrence of the unexpected behavior is the vehicle abnormality. When the time of the occurrence of the unexpected behavior fails to satisfy the predetermined timing condition with respect to the time of acquiring the vehicle abnormality information, the vehicle abnormality influence determination section determines that the cause of the occurrence of the unexpected behavior is not the vehicle abnormality. When the vehicle abnormality influence determination section determines that the cause of the occurrence of the unexpected behavior is the vehicle abnormality, the record control section is prohibited from recording the behavior data relating to the unexpected behavior in the memory. When the vehicle abnormality influence determination section determines that the cause of the occurrence of the unexpected behavior is not the vehicle abnormality, the record control section records the behavior data relating to the unexpected behavior in the memory as an unexpected behavior data.

According to a second example of the present disclosure, a recording apparatus configured to acquire vehicle abnormality information indicative of a vehicle abnormality and a vehicle behavior data is provided. The recording apparatus comprises a memory, a behavior determination section, a vehicle abnormality influence determination section, and a record control section. The behavior determination section determines an occurrence of an unexpected behavior based on the acquired behavior data. In response to the occurrence of the unexpected behavior determined by the behavior determination section, the vehicle abnormality influence determination section determines whether or not a cause of the occurrence of the unexpected behavior is the vehicle abnormality. When a time of the occurrence of the unexpected behavior satisfies a predetermined timing condition with respect to a time of acquiring the vehicle abnormality information, the vehicle abnormality influence determination section determines that the cause of the occurrence of the unexpected behavior is the vehicle abnormality. When the time of the occurrence of the unexpected behavior fails to satisfy the predetermined timing condition with respect to the time of acquiring the vehicle abnormality information, the vehicle abnormality influence determination section determines that the cause of the occurrence of the unexpected behavior is not the vehicle abnormality. When the vehicle abnormality influence determination section determines that the cause of the occurrence of the unexpected behavior is the vehicle abnormality, the record control section is prohibited from recording the behavior data relating to the unexpected behavior in the memory. When the vehicle abnormality influence determination section determines that the cause of the occurrence of the unexpected behavior is not the vehicle abnormality, the record control section records the behavior data relating to the unexpected behavior in the memory as an unexpected behavior data.

According to the above, it is possible to improve the unexpected behavior determination accuracy.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
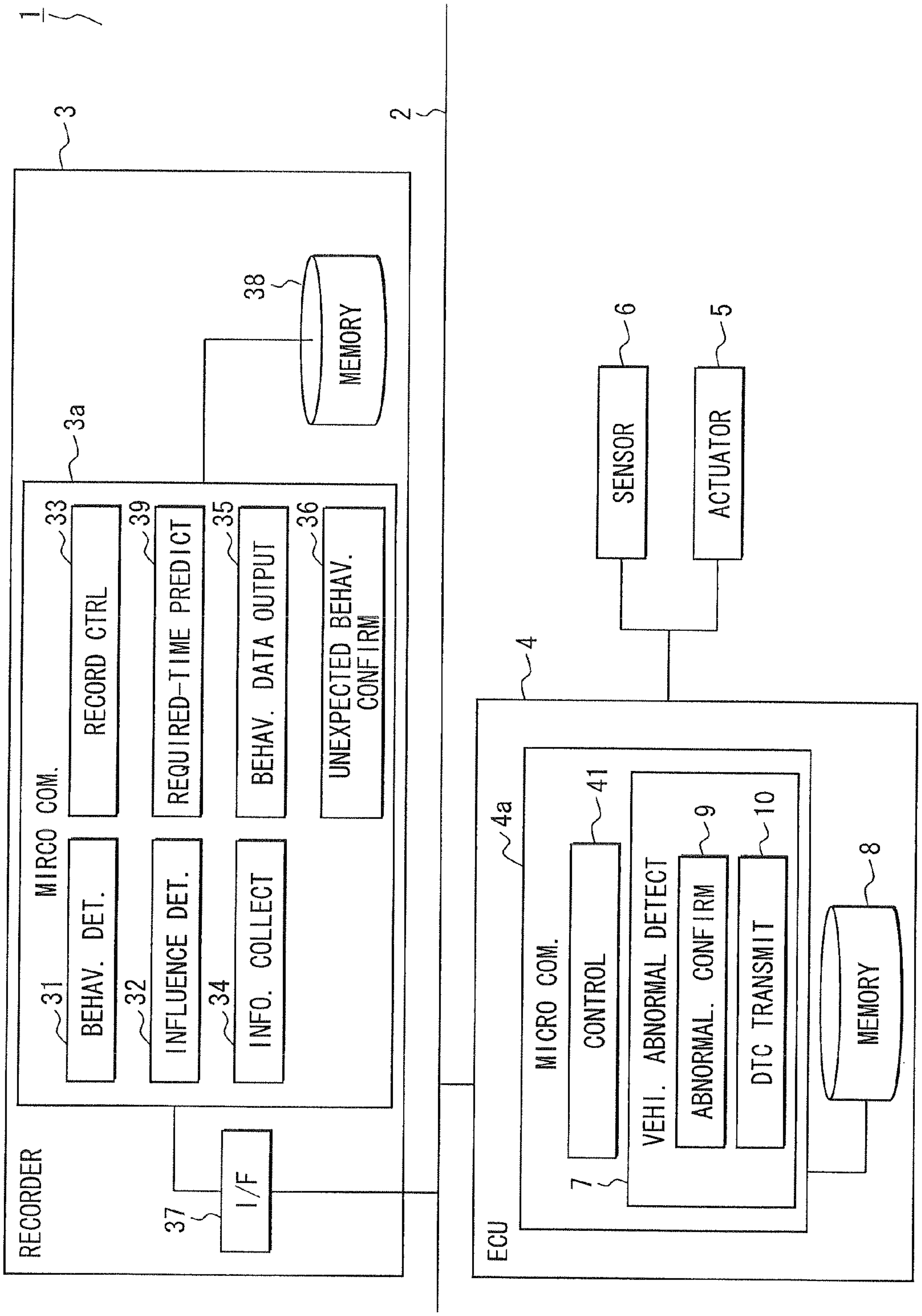
FIG. 1 is a functional block diagram illustrating a vehicle behavior data recording control system of a first embodiment.

A first embodiment will be described with reference to FIGS. 1 to 16. In the first embodiment, a vehicle behavior data recording control system 1 is connected with a recoding apparatus 3 and an electronic control unit (ECU) 4 via a controller area network (CAN) bus 2 acting as an in-vehicle network. The ECU 4 is connected with an actuator 5, a sensor 6, a signal line, and the like. The ECU 4 comprises a microcomputer 4*a* including a central processing unit (CPU), a read-only memory (ROM), and a random access memory (RAM). The microcomputer can serve as a controller 41 (corresponding to a control means or section), which control its control target according to an input from the sensor 6 or the like. The control target of the controller 41 includes the actuator 5. The ECU 4 includes a vehicle abnormality detection apparatus 7 and a non-volatile memory 8. The vehicle abnormality detection apparatus 7 may be provided by a self-diagnosis function of the microcomputer 4*a*.

There are multiple ECUs connected with the CAN bus 2, including an engine ECU, a transmission ECU, an antilock brake system (ABS) ECU, a car navigation ECU, a meter ECU, an air conditioner ECU etc. For simplification of drawings, the ECU 4 is illustrated as including a collection of these ECUs. The actuator 5 connected with the ECU 4 may be one or more actuators.

Based on a detection signal from the sensor 6, each ECU 4 supplies a control signal to the actuator, thereby executing an intended-control operation that the each ECU is responsible for. When the vehicle abnormality detection apparatus 7 of the ECU 4 detects a vehicle abnormality based on no response of the actuator 5 or the sensor 6 or based on an abnormality value in vehicle information, the vehicle abnormality detection apparatus 7 transmits a vehicle abnormality data (referred to also as "Diagnostic Trouble Code (DTC) data") to the CAN bus 2 and records the DTC data in the non-volatile memory 8. Alternatively, when the vehicle abnormality detection apparatus 7 detects a signal line disconnection failure or the like, the vehicle abnormality detection apparatus 7 transmits a DTC data to the CAN bus 2 and records the DTC data in the non-volatile memory 8. For each ECU, the DTC data includes information indicating type of the vehicle abnormality and fail counter value (called "FC value"). The vehicle abnormality detection apparatus 7 includes a vehicle abnormality confirmation section 9 and a DTC information transmission section 10, which may be implemented by software and/or hardware of the microcomputer 4*a*.

Figure 2:
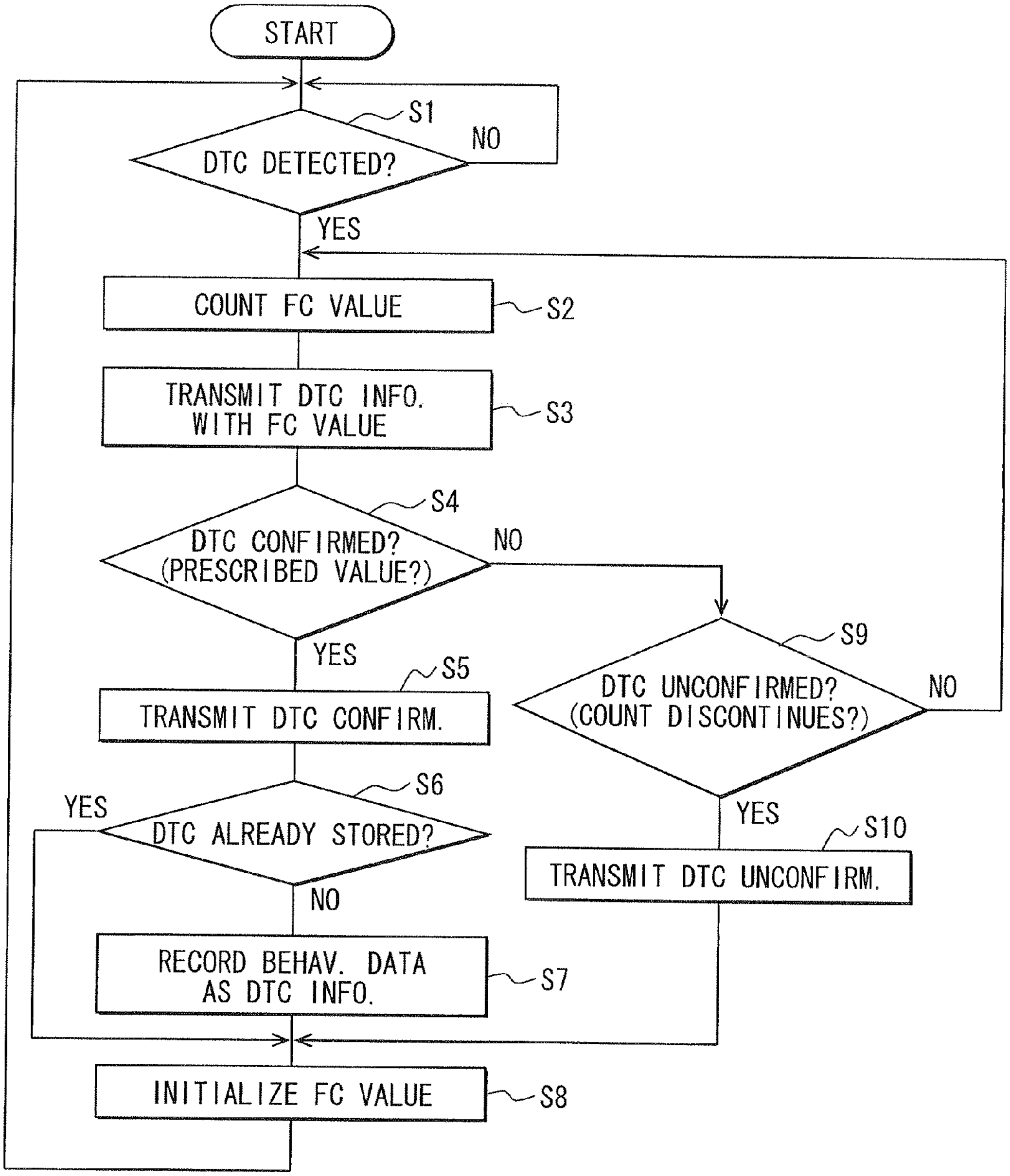
FIG. 2 is a flowchart illustrating an operation of a vehicle abnormality detection apparatus.
Figure 5:
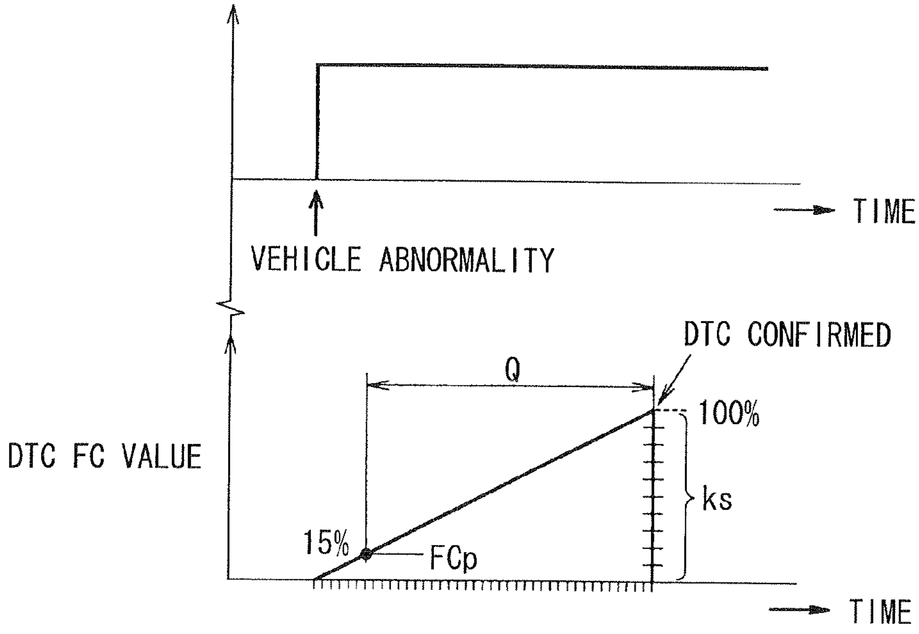
FIG. 5 is a diagram illustrating a transition from vehicle abnormality occurrence to vehicle abnormality confirmation and illustrating a manner of the vehicle abnormality confirmation.

Operation of the vehicle abnormality detection apparatus 7 will be described with reference to FIG. 2. In step S1, the vehicle abnormality detection apparatus 7 determines whether or not the DTC is detected based on the self-diagnosis function. When the DTC is detected, process proceeds to step S2. In step S2, the vehicle abnormality detection apparatus 7 counts the FC value, which indicates a transition phase from DTC occurrence (first detection) to DTC confirmation. In step S3, the vehicle abnormality detection apparatus 7 transmits the counted value of the FC value together with the DTC data to the CAN bus 2. As shown in FIG. 5, in the vehicle abnormality, a variable "k" increases to "k+1" each time the occurrence of the vehicle abnormality continues for a unit time. The FC value is calculated as a "(k/ks)×100[%]", where "ks" is a value corresponding to 100% of the FC value.

As shown in FIG. 5, after the DTC occurs (emerges), the FC value, which is expressed in percentage, successively is increased from an initial value (0%). This FC value is counted in step S2. When the FC value reaches a prescribed value (100%), the vehicle abnormality confirmation section 9 of the vehicle abnormality detection apparatus 7 determines that the vehicle abnormality is confirmed in step S4, corresponding to a DTC confirmation. In step S5, the vehicle abnormality detection apparatus 7 transmits DTC confirmation information to the CAN bus 2.

In step S6, it is determined whether or not a behavior data relating to this DTC is already stored in the non-volatile memory 8. When it is determined that the behavior data relating to the DTC is not stored in the non-volatile memory 8, the process proceeds to step S7. In step S7, the behavior data at that time, which includes a vehicle state data and the like, is recorded in the non-volatile memory 8. In step S8, the FC value is returned to the initial value, and initial value information is transmitted to the CAN bus 2 from the DTC information transmission section 10. An idea of steps S6 and S7 is that for each type of DTC, the behavior data should be recorded only once. Thus, even when the same type DTC is detected many times, only the DTC information corresponding to the first detection is recorded. Wasteful use of the memory is avoided.

Figure 6:
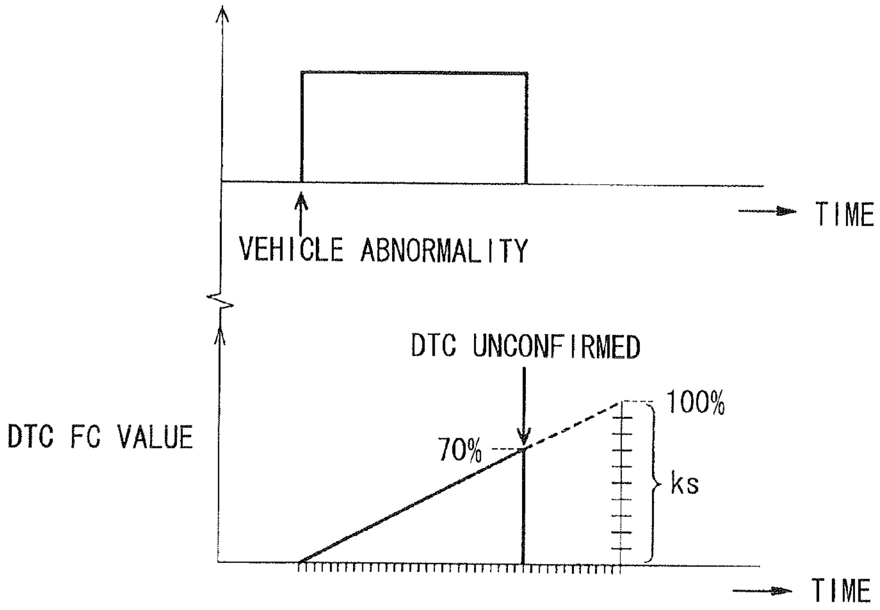
FIG. 6 is a diagram illustrating an unconfirmed vehicle abnormality and illustrating a manner of vehicle abnormality un-confirmation.
Figure 7:
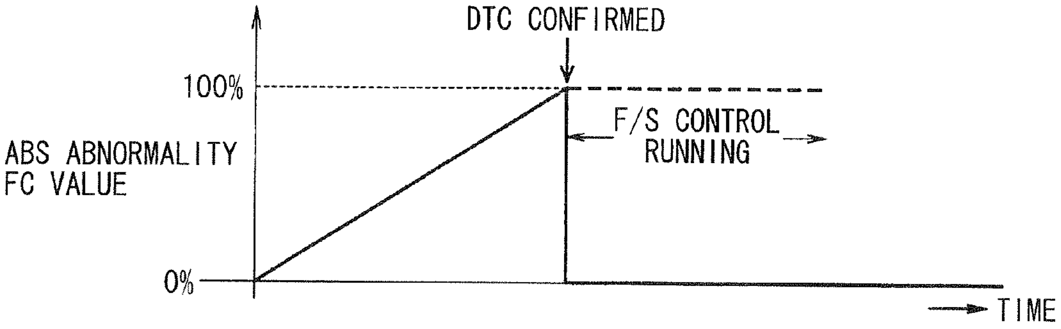
FIG. 7 is a diagram illustrating a fail-safe operation.

When the occurrence of the DTC discontinues as shown in FIG. 6, it is determined that the vehicle abnormality is unconfirmed in step S9, corresponding to DTC un-confirmation. Then, in step S10, the DTC information transmission section 10 transmits DTC un-confirmation information to the CAN bus 2. Thereafter, in step 8, the DTC information transmission section 10 returns the FC value to the initial value and transmits initial value information to the CAN bus 2. When it is determined in step S9 that the occurrence of DTC does not discontinue, the process returns to step S2 to keep counting the FC value. While it is determined in step S1 that the DTC does not occur, the FC value (initial value) may be regularly transmitted to the CAN bus 2.

Depending on DTC types, after the FC value reaches the prescribed value of 100%, in other words, after the vehicle abnormality is confirmed, a vehicle-abnormality-follow-up operation such as a fail-safe operation may be performed. In this case, as show in FIG. 7, fail-safe (F/S) control running information may be transmitted to the CAN bus 2 to indicate that the vehicle-abnormality-follow-up operation is running.

As shown in FIG. 1, the recording apparatus 3 comprises a microcomputer 3*a* including a CPU, a ROM, and a RAM (each not shown). The microcomputer 3*a* is connected to the CAN bus 2 via a communication interface (I/F) 37. The recording apparatus 3 includes a behavior determination section 31, a vehicle abnormality influence determination section 32, a record control section 33, an information collection section 34, a behavior data output section 35, an unexpected behavior confirmation section 36, and a required time prediction section 39, which may be implemented by hardware and/or software of the microcomputer 4*a*. The recording apparatus 3 further includes a non-volatile memory 38 connected with the microcomputer 3*a*. Each non-volatile memory 38 and 8 may include a rewritable flash memory. An example of the unexpected behavior is that a vehicle driver suddenly presses down an accelerator and a resultant acceleration exceeds a predetermined condition. The predetermined condition is set in the recording apparatus 3.

The recording apparatus 3 successively receives a latest behavior data indicative of a vehicle state from the CAN bus 2, and successively receives the DTC information from the CAN bus 2. The behavior data includes a variety of control information and a variety of vehicle information indicative of vehicle behaviors. The information collection section 34 can collect a variety of behavior data from the CAN bus 2.

The behavior data provided from the ECU 4 to the CAN bus 2 includes an engine water temperature, an exhaust pipe pressure, an engine revolution, a vehicle speed, an ignition timing (e.g., advanced ignition timing), an intake air temperature, an air flow rate, a throttle opening degree, an accelerator position, and other various behavior data. The DTC includes a revolution signal system abnormality, an ignition signal system abnormality, an engine misfire abnormality, a sensor signal abnormality of each sensor, a fuel system abnormality, a meter relating abnormality, and other various DTCs.

Operation of the recording apparatus 3 will be described with reference to FIG. 3. In step T1, the recording apparatus 3 (specifically, the behavior determination section 31) determines whether or not an unexpected behavior has occurred. When the unexpected behavior has occurred, process proceeds to step T2. In step T2, the recording apparatus 3 (specifically, the vehicle abnormality influence determination section 32) determines whether or not a time of occurrence (acquiring) of the unexpected behavior satisfies a predetermined timing condition with respect to a time of acquiring the DTC information. The predetermined timing condition may be satisfied when the time of occurrence (acquiring) of the unexpected behavior is in a time range Q (see FIG. 5 for 15% to 100%). In the time range Q, the FC value in the DTC information is greater than or equal to a prescribed value FCp (e.g., 15%). The prescribed value of 15% is given in consideration of a period of time from the time of occurrence of the DTC to a time when the driver performs the unexpected behavior in response to the occurrence of the DTC. However, the prescribed value may be arbitrarily settable according to DTC type or the like. In a certain DTC type, a period of time from the time of the occurrence of the DTC to a time when the driver performs the unexpected behavior may be extremely small. In this case, the prescribed value of the FC value may be set to 1%.

Figure 8:
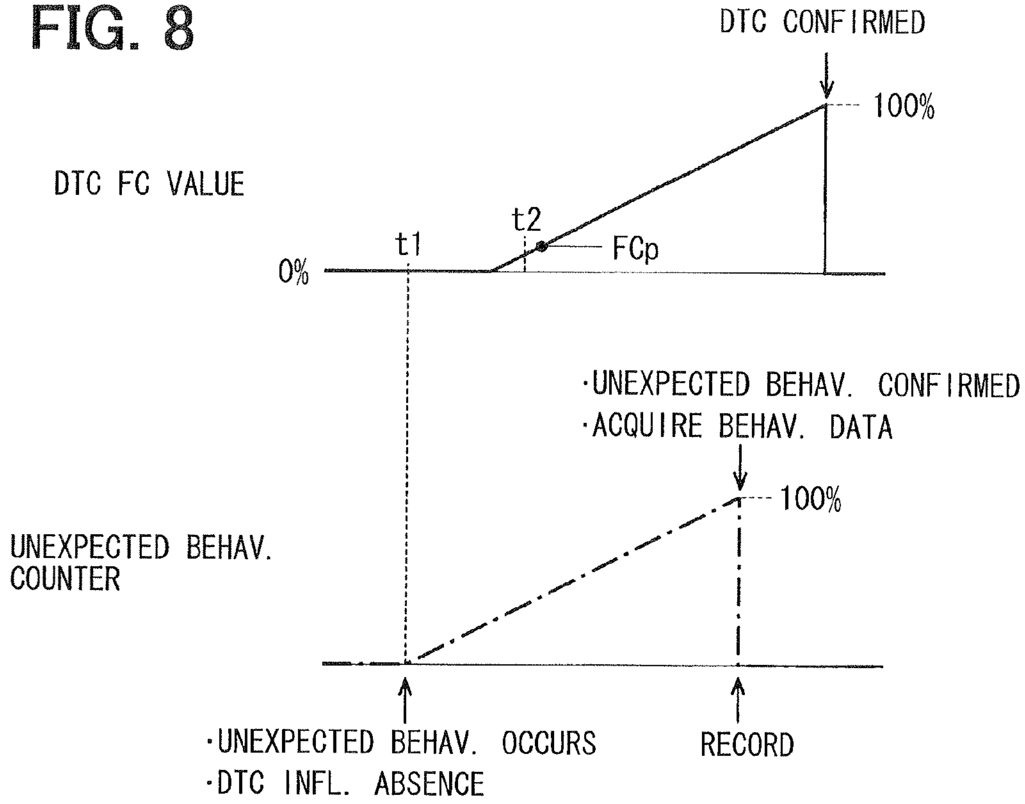
FIG. 8 is a diagram illustrating a first example of transition of a FC value and an unexpected behavior counter value.
Figure 9:
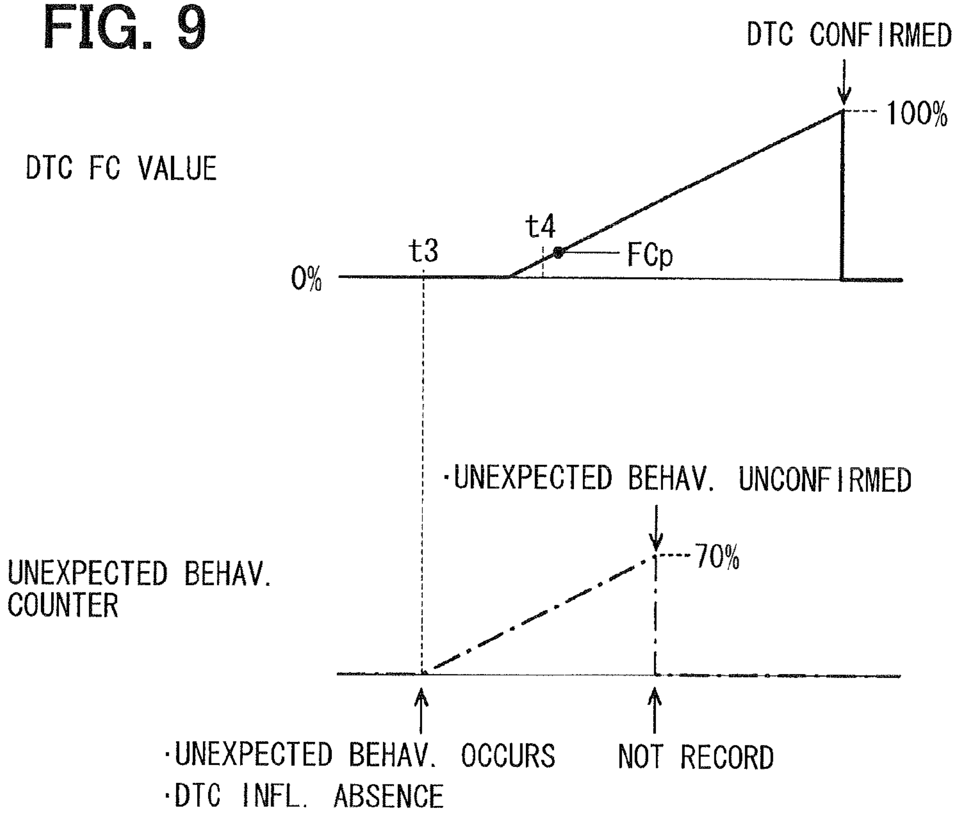
FIG. 9 is a diagram illustrating a second example of transition of a FC value and an unexpected behavior counter value.
Figure 10:
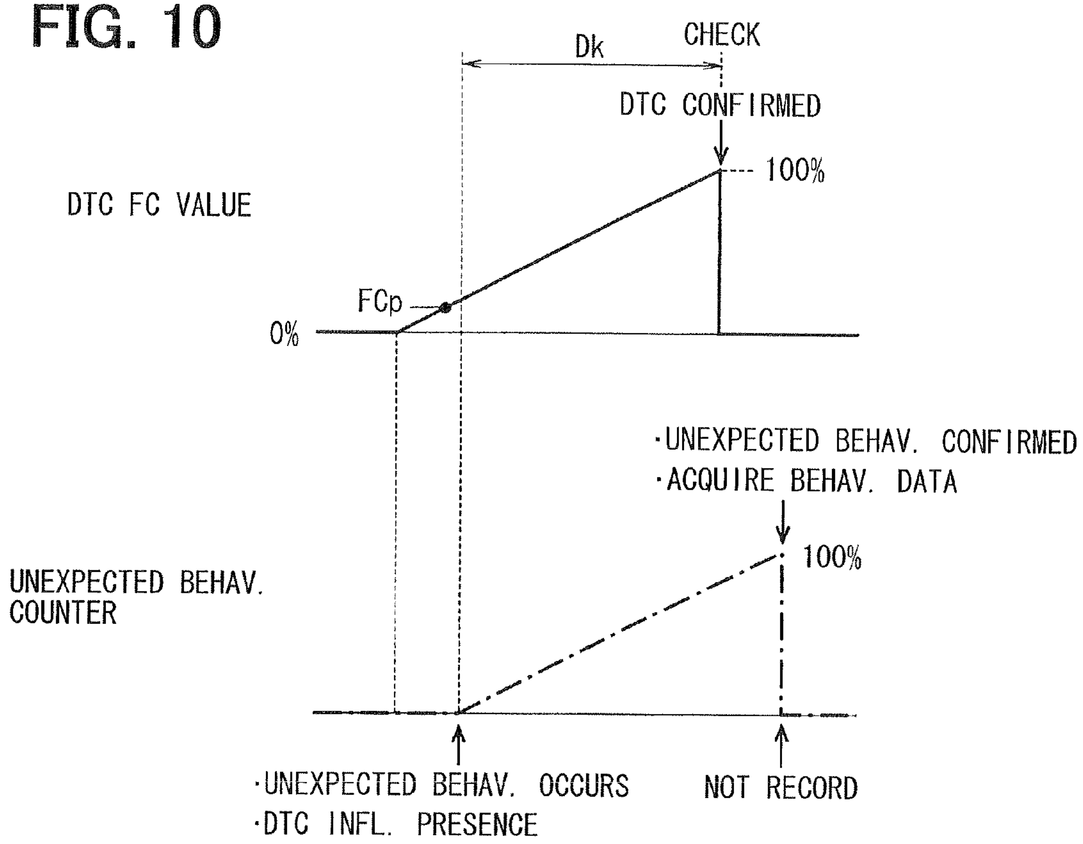
FIG. 10 is a diagram illustrating a third example of transition of a FC value and an unexpected behavior counter value.
Figure 11:
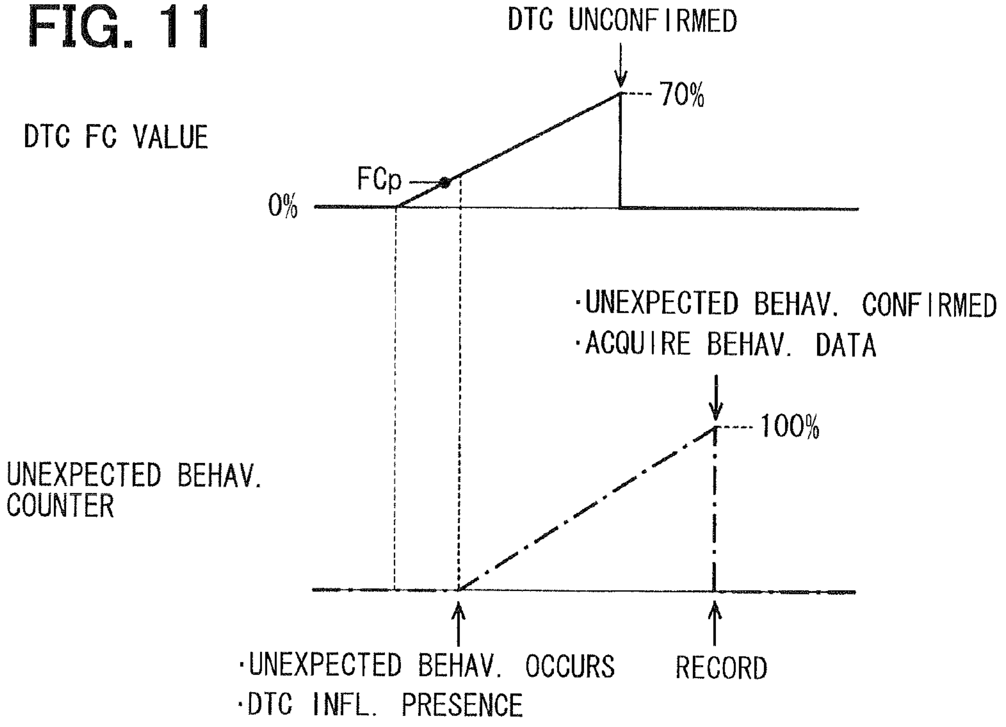
FIG. 11 is a diagram illustrating a fourth example of transition of a FC value and an unexpected behavior counter value.
Figure 12:
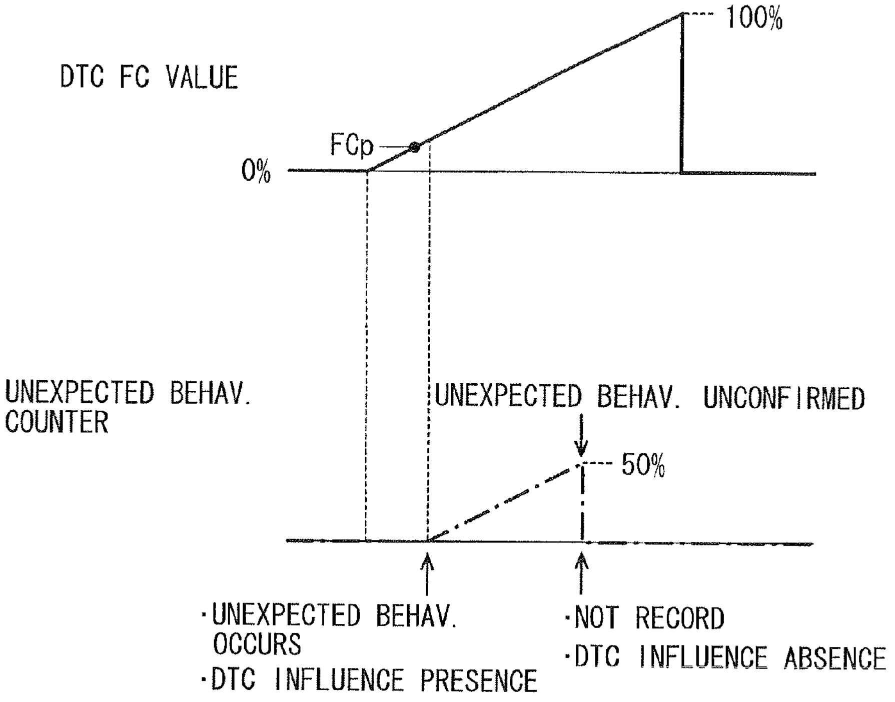
FIG. 12 is a diagram illustrating a fifth example of transition of a FC value and an unexpected behavior counter value.
Figure 13:
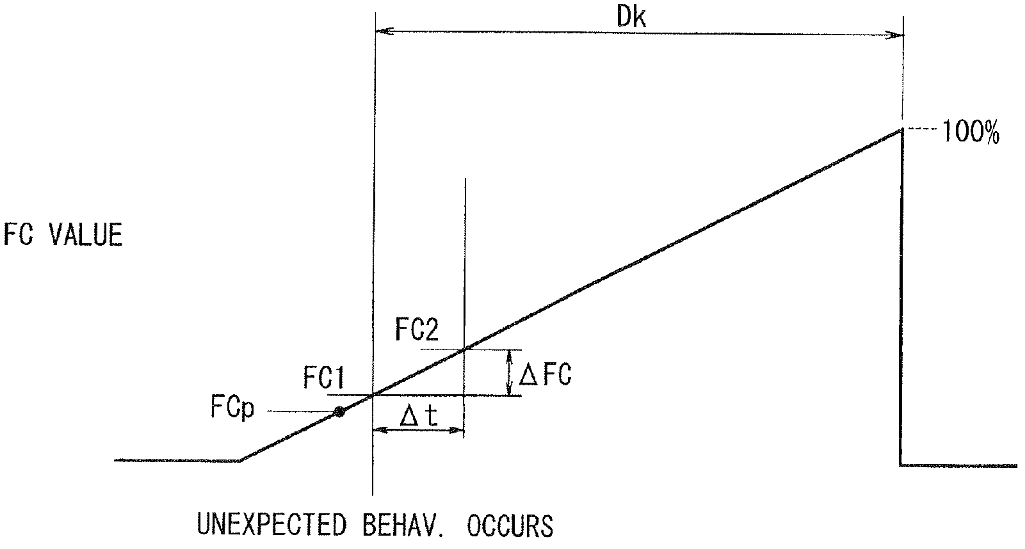
FIG. 13 is a diagram conceptually illustrating a required time prediction manner.

FIGS. 8 and 9 show examples in which the time of occurrence of an unexpected behavior is in a time range where the FC value is less than the prescribed value FCp of 15% (see t1, t2, t3, and t4). In these cases, step T2 results in NO and the process proceeds to step T13. In step T13, the recording apparatus 3 (specifically, the vehicle abnormality influence determination section 32) determines that a cause of the occurrence of the unexpected behavior is not an influence of the vehicle abnormality. In other words, the vehicle abnormality influence determination section 32 determines that a DTC influence is absent. FIGS. 10 to 12 show examples in which the time of occurrence of an unexpected behavior is in a time range where the FC value is greater than or equal to the prescribed value FCp (see t1", "t2" in FIG. 8 and t3" and "t4" in FIG. 9). In these cases, step T2 results in YES and the process proceeds to step T3. In step T3, the recording apparatus 3 (specifically, the vehicle abnormality influence determination section 32) determines that the cause of the occurrence of the unexpected behavior is the influence of the vehicle abnormality. In other words, the vehicle abnormality influence determination section 32 determines that the DTC influence is present.

Figure 4:
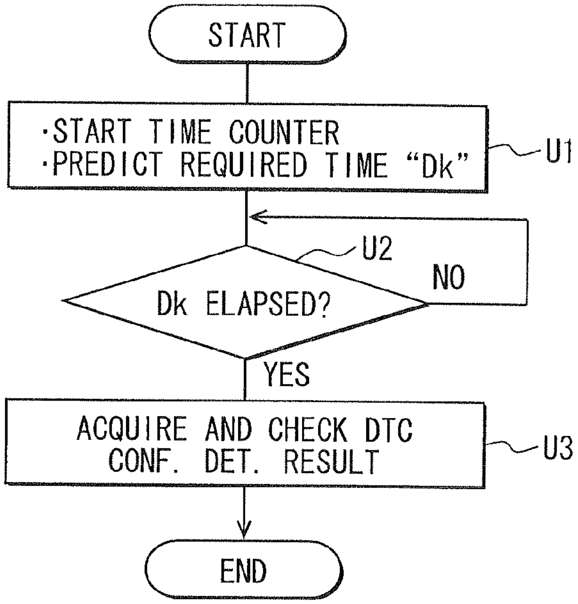
FIG. 4 is a flowchart illustrating an operation relating to a required time prediction.

When it is determined that the DTC influence is present in step T3, a routine illustrated in FIG. 4 is performed in order to acquire a DTC confirmation determination result. In step U1, based on a rate of change "$\alpha$" in the fail counter value, the recording apparatus 3 (specifically, the required time prediction section 39) predicts a required time "Dk" from a first time point to a second time point (see FIG. 13). The first time point is a time when the behavior determination section 31 determines the occurrence of the unexpected behavior. The second time point is a time when the vehicle abnormality confirmation section 9 of the vehicle abnormality detection apparatus 7 determines that the vehicle abnormality is confirmed. The rate of change "a" is given as (FC2−FC1)/$\Delta$t, where FC1 is the FC value at time of the occurrence of the unexpected behavior, FC2 is the FC value after elapse of unit time Δt.

The required time "Dk" is calculated to be Dk=(100−FC1)/α. At the time of occurrence of an unexpected behavior, a time counter starts counting. In step U2, the recording apparatus 3 waits for elapse of the required time Dk. Upon the elapse of the required time Dk, the process proceeds to step U3. In step U3, the recording apparatus 3 acquires a DTC confirmation determination result from the CAN bus 2 and determines whether or not the DTC confirmation is indicated or the DTC un-confirmation is indicated. It may be preferable that the required time Dk be longer than the above calculated value.

Figure 3:
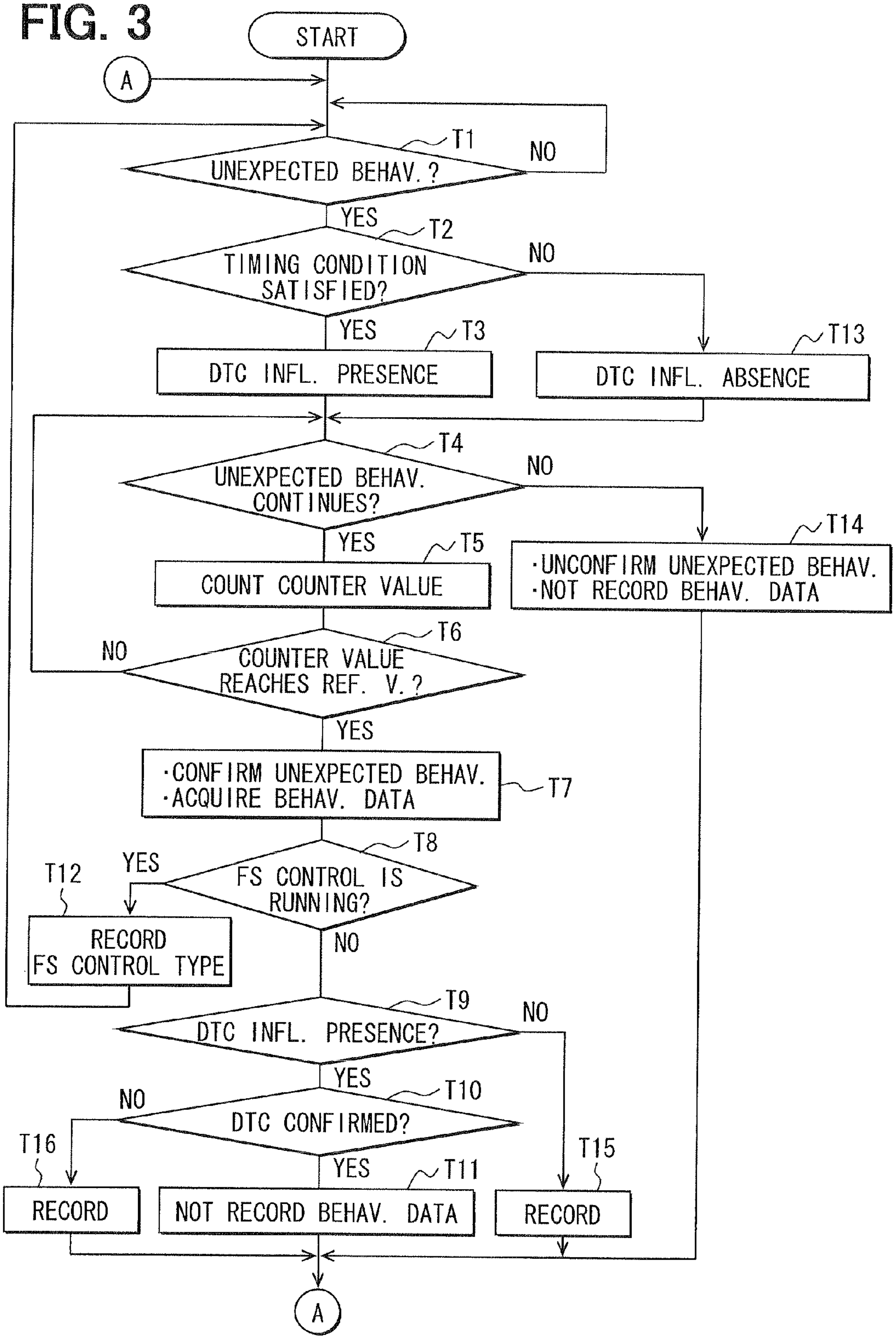
FIG. 3 is a flowchart illustrating an operation of a recording apparatus of the first embodiment.
Figure 14:
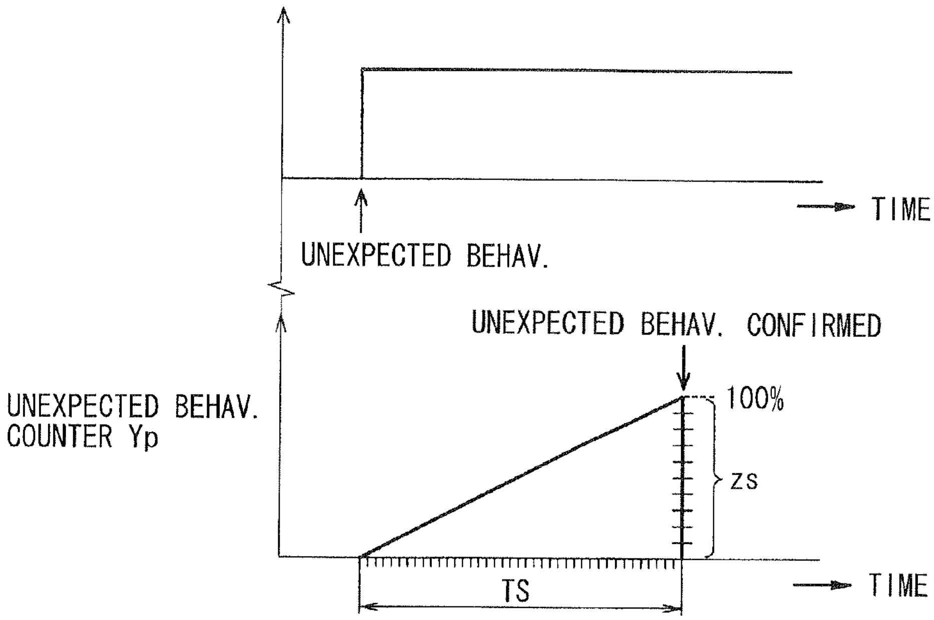
FIG. 14 is a diagram illustrating a confirmed unexpected behavior.
Figure 15:
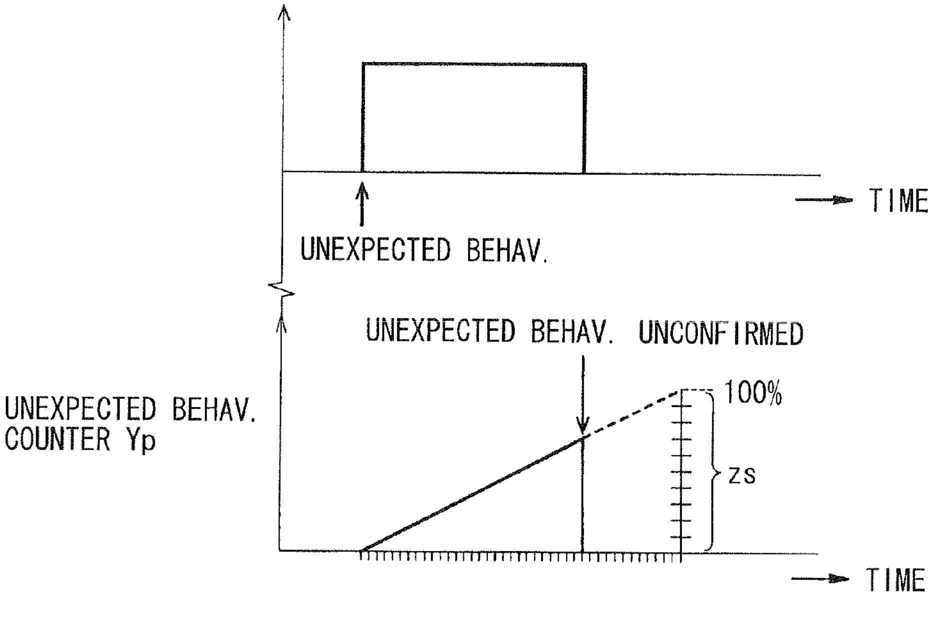
FIG. 15 is a diagram illustrating an unconfirmed unexpected behavior.

Explanation returns to FIG. 3. After step T3, the process proceeds to step T4. In step T4, the recording apparatus 3 determines whether or not the unexpected behavior continues. When the continuing unexpected behavior detection is detected, the process proceeds to step T5. In step T5, the recording apparatus 3 counts a counter value Yp [%] for unexpected behavior confirmation. This counter value Yp [%] for unexpected behavior confirmation is calculated in a manner similar to that in the FC value. Specifically, as shown in FIGS. 14 and 15, a variable "z" increases to "k+1" each time the occurrence of the unexpected behavior continues for a unit time. The counter value Yp [%] for unexpected behavior confirmation is calculated as a "(z/zs)×100[%]", where "zs" is a value corresponding to 100% of the counter value Yp.

In step T6, the recording apparatus 3 determines whether nor not the counter value Yp[%] for unexpected behavior confirmation reaches a reference value (e.g., 100%). When the counter value does not reach the reference value, the process returns to step T4. When it is determined in step T6 that the counter value reaches the reference value 100%, the process returns to step T7. In other words, when the unexpected behavior continues for a predetermined period of time "TS" as illustrated in FIG. 14, the process proceeds to step T7. In step T7, the recording apparatus 3 (the unexpected behavior confirmation section 36) determines that the occurrence of the unexpected behavior is confirmed. Additionally, the recording apparatus 3 acquires the behavior data via the CAN bus 2. Alternatively, when the recording apparatus 3 first detects the occurrence of the unexpected behavior, the recording apparatus 3 acquires the behavior data.

In step T4, it may be determined that the unexpected behavior discontinues. In other words, it may be determined that the unexpected behavior does not continue for the predetermined period of time "TS", which is a reference value. In this case, the process proceeds to step T14 where the recording apparatus 3 (specifically, the unexpected behavior determination section 36) determines that the unexpected behavior is unconfirmed. Additionally, the recording apparatus 3 clears the counter value Yp for unexpected behavior confirmation (Yp=0) without recording the behavior data. Specifically, as an exceptional measure, the recording apparatus 3 is prohibited from recording the behavior data regardless of a determination result of the vehicle abnormality influence determination section 32 and a determination result of the vehicle abnormality confirmation section 9. FIG. 12 illustrates this situation. After step T7, the process proceeds to step T8. In step T8, the recording apparatus 3 determines whether or not the F/S control operation is running. When it is determined that the F/S control operation is running, the process proceeds to step T12. In step T12, type of the F/S control operation is recorded in the non-volatile memory 38. Thereafter, the process returns to step T1.

When it is determined in step T8 that the F/S control operation is not running, the process proceeds to step T9. In step T9, the recording apparatus 3 determines whether or not a determination result of the vehicle abnormality influence determination section 32 (steps T3, T13) is the presence of the DTC influence. When the determination result is the absence of the DTC influence, the process proceeds to T15. In step T15, the recording apparatus 3 (specifically, the record control section 33) records the behavior data acquired in step T7 in the non-volatile memory 38 as an unexpected behavior data.

When it is determined in step T9 that the DTC influence is present, the process proceeds to step T10. In step T10, the recording apparatus 3 determines whether or not the DTC confirmation determination result acquired in step U3 in FIG. 3 indicates the DTC confirmation. When the DTC confirmation determination result indicates the DTC confirmation, the process proceeds to step T11. In step 11, the recording apparatus 3 (specifically, the record control section 33) does not record the behavior data. When the DTC confirmation determination result indicates the DTC un-confirmation, the process proceeds to step T16. In step T16, as an exceptional measure, the unexpected behavior is recorded in the non-volatile memory 38. This situation is shown in FIG. 11.

Figure 16:
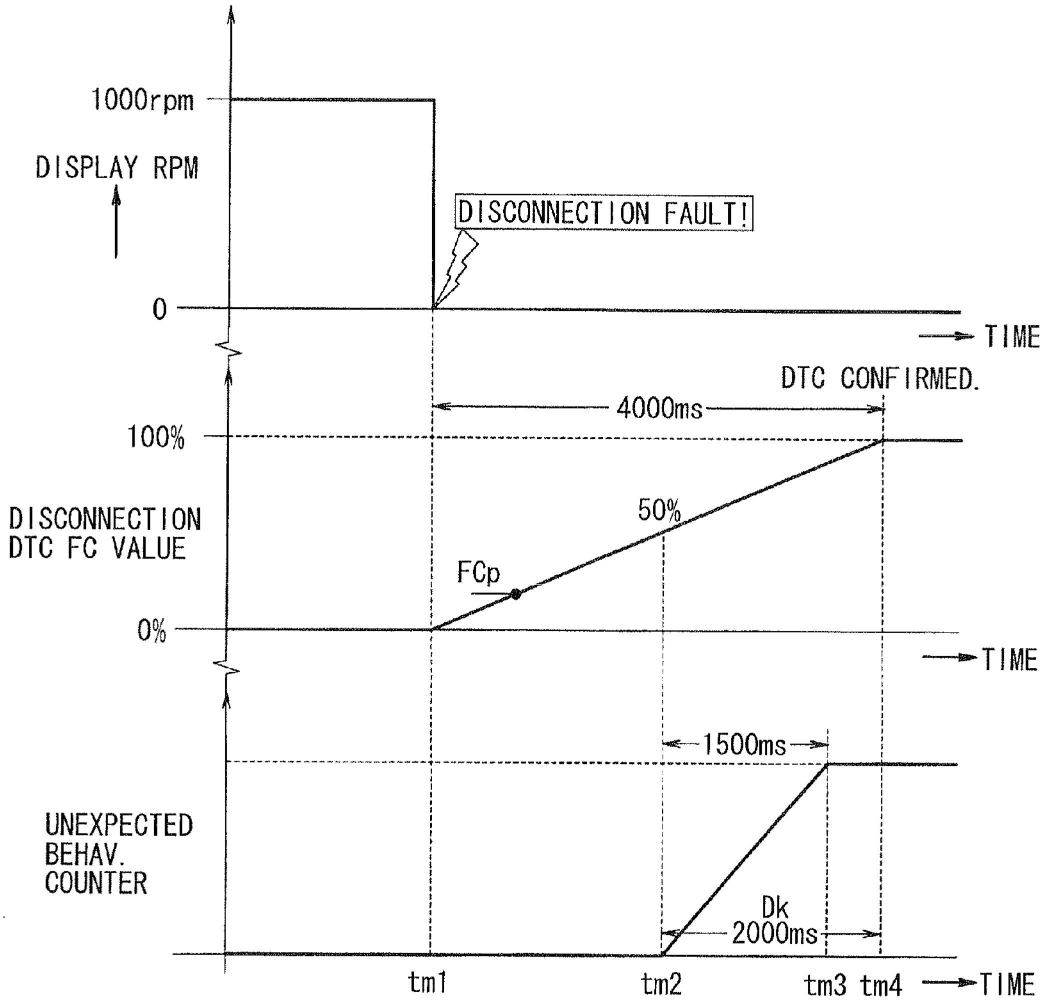
FIG. 16 is a diagram illustrating a concrete example of transition of a FC value and transition of an unexpected behavior counter value.

An example operation of the recording apparatus 3 will be described with reference to FIG. 16. As shown in FIG. 16, when a disconnection fault of a signal line for engine revolution display occurs at a time "tm1", a tachometer suddenly changes from 1000 rpm to 0 rpm. The meter ECU detects a DTC relating to this disconnection fault, and counts and transmits a FC value (steps S1 to S3 in FIG. 3). In this case, because the display changes to O rpm, the driver may be upset and press down the accelerator. In this case, at a time tm2, the occurrence of the unexpected behavior is determined (YES in step T1 in FIG. 3). Since the F/S control operation is not running, and since the FC value of the DTC is 50% and exceeds the prescribed value FCp, it is determined that the DTC influence is present (Yes in step T3, and step T3). In addition to the above, the recording apparatus 3 starts counting an unexpected behavior count value and predicts a required time for DTC confirmation (step U1). In this example, the predicted required time is 2000 ms.

At a time tm3, it is determined that the unexpected behavior is confirmed. At a time tm4 (after elapse of the required time Dk), it is determined whether or not the DTC is confirmed (step T10). In this example, it is determined that the DTC is confirmed. Because of this, the behavior data is not recorded (step T11).

In the present embodiment, the recording apparatus 3 acquires the behavior data and the DTC information from the CAN bus 2. When the behavior determination section 31 of the recording apparatus 3 determines the occurrence of the unexpected behavior based on the behavior data, the vehicle abnormality influence determination section 32 determines whether or not the time of the occurrence of the unexpected behavior satisfies the predetermined timing condition with respect to the time of acquiring the DTC information. The predetermined timing condition is satisfied when the time of the occurrence of the unexpected behavior is in a time range where the FC value is greater than or equal to the prescribed value FCp. When the satisfaction of the predetermined condition is determined, the recording apparatus 3 determines that the cause of the occurrence of the unexpected behavior is the influence of the vehicle abnormality (step T9). Thereafter, if the DTC is confirmed (YES in step 10), the record control section 33 is prohibited from recording the behavior data relating to the unexpected behavior in the non-volatile memory 38 (step T11). It should be noted that if a DTC type ensures that that DTC be confirmed after the DTC occurrence, the step T10 can be skipped.

When the time of the occurrence of the unexpected behavior fails to satisfy the predetermined timing condition, the vehicle abnormality influence determination section 32 determines that the cause of the unexpected behavior is not the influence of the vehicle abnormality. In this case (NO in step T9), the record control section 33 records the behavior data relating to the unexpected behavior in the non-volatile memory 38 as the unexpected behavior data.

Therefore, only the unexpected behavior, a cause of which is hard to identify, is recorded in the non-volatile memory 38. The memory can be efficiently used. Additionally, since only the behavior data adapted for analysis is recorded in the non-volatile memory 38, proper analysis of the unexpected behavior becomes possible.

Incidentally, the vehicle abnormality detection apparatus 7 may detect a DTC that temporarily occurs due to some reasons (e.g., the superimposing of a disturbance noise on a sensor signal) and disappears soon. That is, the DTC is unconfirmed. In view of this, a significance of the FC value used for the DTC confirmation and un-confirmation in the vehicle abnormality detection apparatus 7 is that the recording apparatus 3 can handle a true DTC. Additionally, from this FC value, a time transition phase from a DTC occurrence to a DTC confirmation can be identified. That is, a temporal relationship of the DTC with an occurrence of an unexpected behavior can be identified from the FC value. In the present embodiment, if the time of the occurrence of the unexpected behavior determined by the behavior determination section 31 satisfies the predetermined timing condition, it can be concluded based on the FC value that after the DTC occurs, the unexpected behavior occurs. Therefore, based on the FC value, it can be determined whether or not the cause of the unexpected behavior is the influence of the DTC. Simple and high speed determination processes can be provided.

Advantages associated with the unexpected behavior confirmation section 36 are, for example, as follows. In some cases, it would not matter if the unexpected behavior were confirmed in response to first unexpected behavior detection. However, in other cases, a behavior data causing a determination of an unexpected behavior occurrence may be an unstable or noisy data. In view of this, the unexpected behavior confirmation section 36 is provided to determine whether or not the unexpected behavior is confirmed finally. Thus, a true unexpected behavior data can be identified. A significance of the vehicle abnormality confirmation section 9 of the vehicle abnormality detection apparatus 7 is similar to that of the unexpected behavior confirmation section 36. Specifically, since a first-detected DTC may be an unstable or noisy data in some cases, the vehicle abnormality confirmation section 9 determines whether or not the DTC is confirmed finally. In this way, a true DTC is identified.

When it is determined that the unexpected behavior or the DTC is temporary based on a result of the unexpected behavior confirmation section 36 or the vehicle abnormality confirmation section 9, a recording control operation can be adjusted in order to take an exceptional measure. Specifically, even if the vehicle abnormality influence determination section 32 determines that the cause of the occurrence of the unexpected behavior is the influence of the vehicle abnormality, the record control section 33 records the behavior data as the unexpected behavior data as long as (i) the vehicle abnormality confirmation section 9 determines that the vehicle abnormality is not confirmed and (ii) the unexpected behavior confirmation section 36 determines that the occurrence of the unexpected behavior is confirmed. When the unexpected behavior confirmation section 36 determines that the occurrence of the unexpected behavior is not confirmed, the record control section 33 is prohibited, as an exceptional measure, from recording the behavior data regardless of a determination result of the vehicle abnormality influence determination section 32 and a determination result of the vehicle abnormality confirmation section 9. Therefore, depending on the unexpected behavior confirmation and un-confirmation and the vehicle abnormality confirmation and un-confirmation, the record control section 33 appropriately determines to record or not record a behavior data (record control operation adjusting). Therefore, it is possible to efficiently use the non-volatile memory 38. Only a behavior data adapted for analysis is recorded.

Moreover, in the present embodiment, the recording apparatus 3 includes the required time prediction section 39, which predicts a required period of time from the occurrence of the unexpected behavior to the confirmation of the DTC. After elapse of the predicted required period of time, the record control section checks whether or not the DTC is confirmed. A reason for employing this configuration is as follows.

As shown in FIG. 1, the DTC confirmation information is transmitted from the vehicle abnormality detection apparatus 7 to the CAN bus 2. There are multiple DTC confirmation patterns. The recording apparatus 3 does not distinguish the DTC confirmation patterns. Specifically, the DTC confirmation information transmitted from the vehicle abnormality detection apparatus 7 may result from such a situation (called "first pattern") where the DTC FC value keeps increasing without being initialized (no DTC un-confirmation) during a period from a time when the behavior determination section 31 determines the occurrence of the unexpected behavior to a time when the DTC is confirmed. In another situation (called "second pattern"), the DTC FC value is initialized at least once and then the DTC FC value again increases, and thereafter, the DTC is confirmed.

The present embodiment takes into account this point. Specifically, the required time predilection section 39 predicts the required time "Dk", which is from the first time point to the second time point based on a rate of change in FC value. After the elapse of the required time "Dk", it is determined whether or not the DTC is confirmed. Therefore, the recording apparatus 3 records the unexpected behavior data in the case of the second DTC confirmation pattern, while the recording apparatus 3 does not records the unexpected behavior data in the case of the first DTC confirmation pattern.

As described above, a result of determination as to whether or not the vehicle abnormality is confirmed is transmitted from the vehicle abnormality detection apparatus 7 to the CAN bus 2. At a time of receipt of the DTC information, the recording apparatus 3 is unaware of when the recording apparatus 3 can acquire the DTC confirmation result. Thus, it is conceivable that in order to surely check the DTC confirmation result after waiting receipt of the DIG confirmation result, the recording apparatus 3 checks the DTC confirmation result a sufficiently-long time after receipt of the DTC confirmation result. However, in this configuration, depending on DTC type, the DTC confirmation result may be transmitted early but checked late. In view of this, the recording apparatus 3 predicts the required time taken to receive the DTC confirmation result by detecting an initial change in the FC value such as an rate of increase or the like. Therefore, the recording apparatus 3 can check, without being far behind from receipt of the DTC information, whether or not the behavior is an unexpected behavior.

In the present embodiment, when the time of occurrence of the unexpected behavior matches the time of acquisition of the F/S control running information, the type of the F/S control operation is recorded. A reason for employing this configuration is as follows. Depending on type of the vehicle abnormality detection apparatus 7 (depending on ECU type), upon detecting a DTC, the vehicle abnormality detection apparatus 7 may perform a F/S control operation. For example, upon detecting and confirming an ABS abnormality, an abnormality detection apparatus for the ABS prohibits the ABS from operating. If the unexpected behavior is detected during this F/S control operation, the F/S control operation following the vehicle abnormality may be a cause of the unexpected behavior.

When the time of occurrence of the unexpected behavior matches the time of acquisition of the F/S control running information, the record control section 33 of the recording apparatus 3 records not the behavior data but the type of the F/S control running information as an exceptional measure. Thus, the type of F/S control operation, which possibly triggers the unexpected behavior, can be recorded. In the present embodiment, the vehicle abnormality detection apparatus 7 is incorporated into the electronic control unit (ECU), which is connected with the CAN bus 2 and controls a predetermined control target. Therefore, a CAN bus connection configuration can be simplified.

Second Embodiment

Figure 17:
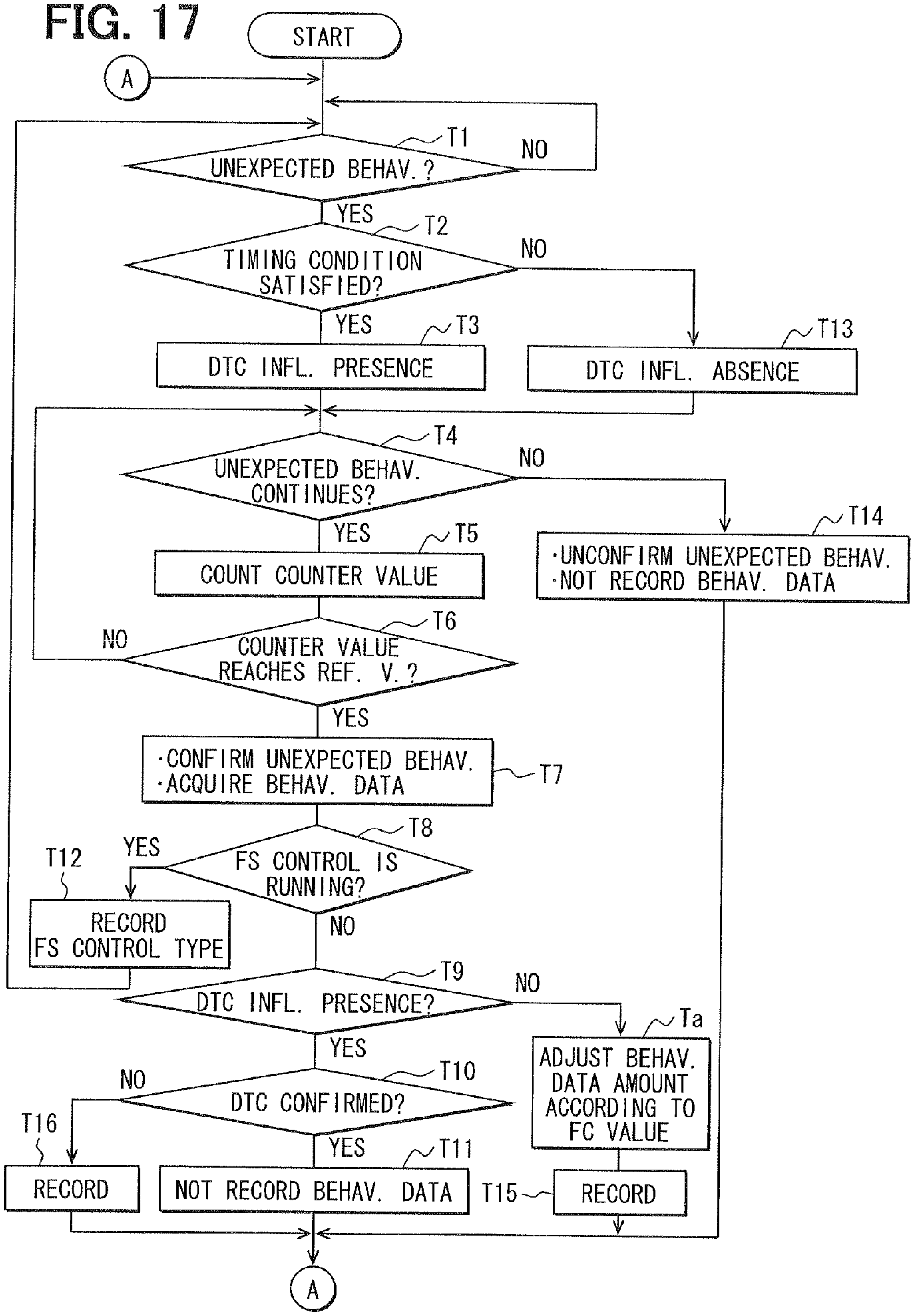
FIG. 17 is a flowchart illustrating operation of a recording apparatus of a second embodiment.

FIG. 17 illustrates a second embodiment. The second embodiment differs from the first embodiment in that step Ta is added before step T15. In step T15, the record control section 33 records the behavior data. In step Ta before this step T15, types of behavior data to be recorded are adjusted in accordance with how large the FC value of DTC at the time of the occurrence of the unexpected behavior is.

Figures 18, 20:
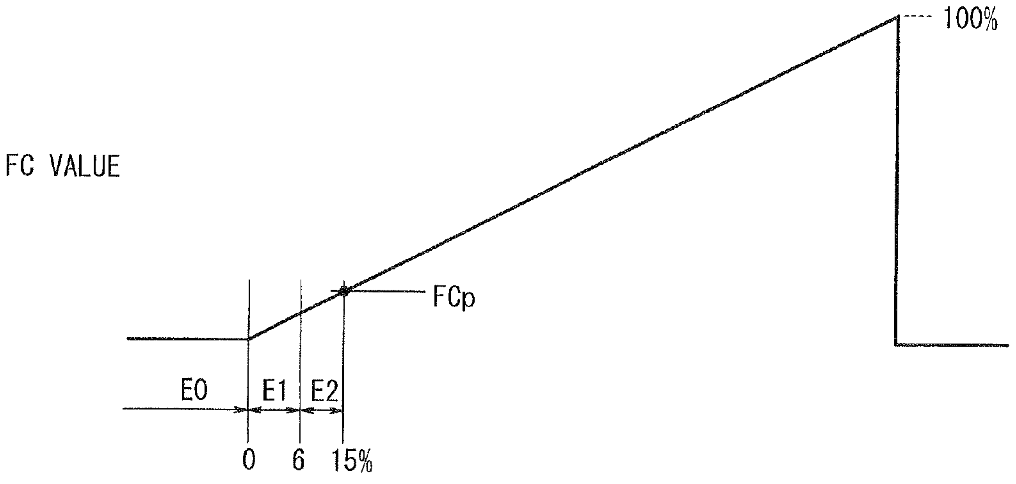
FIG. 18 is a diagram illustrating a FC value.
FIG. 20 is a diagram illustrating a relation between DTC type and prescribed value FCp.

A concrete example is illustrated in FIG. 18. The FC value is classified into three ranges. In a first range corresponding to a time span E0, the FC value is 0%. In a second range corresponding to a time span E1, the FC value is 1% to 6%. In a third range corresponding to a time span E2, the FC value is 6% to 15%. In step Ta, the types of behavior data to be recorded are adjusted such that the number of types of behavior data to be recorded in step 15 increases in ascending order of E0, E1 and E2.

This adjustment is performed in consideration of the following. In step T9, it may be determined that the DTC influence is absent. In this case, if the FC value at the time of determination of the occurrence of the unexpected behavior is 0% (a DTC is not detected), the DTC influence may be truly absent. However, if the FC value is not 0% (e.g., between 1% and 15%), there is a possibility that the DTC influence is not truly absent. In this case, a time interval between the DTC detection and the unexpected behavior detection increases as the FC value increases. In the second embodiment, the number of types of unexpected behavior data to be recorded is adjusted by the record control section 33 based on whether or not the FC value at the time of determination of the unexpected behavior is larger than a threshold (e.g., 6%). For example, as the FC value at the time of determination of the unexpected behavior is larger, the number of types of unexpected behavior data to be recorded is smaller. Thus, the types of behavior data to be recorded can be properly changed by taking into account a possibility of relation between the type of behavior data and the DTC type. The threshold of the FC value for adjusting the number of types of unexpected behavior data to be recorded is not limited to 6%. The FC value may be classified into more than three ranges.

Third Embodiment

Figure 19:
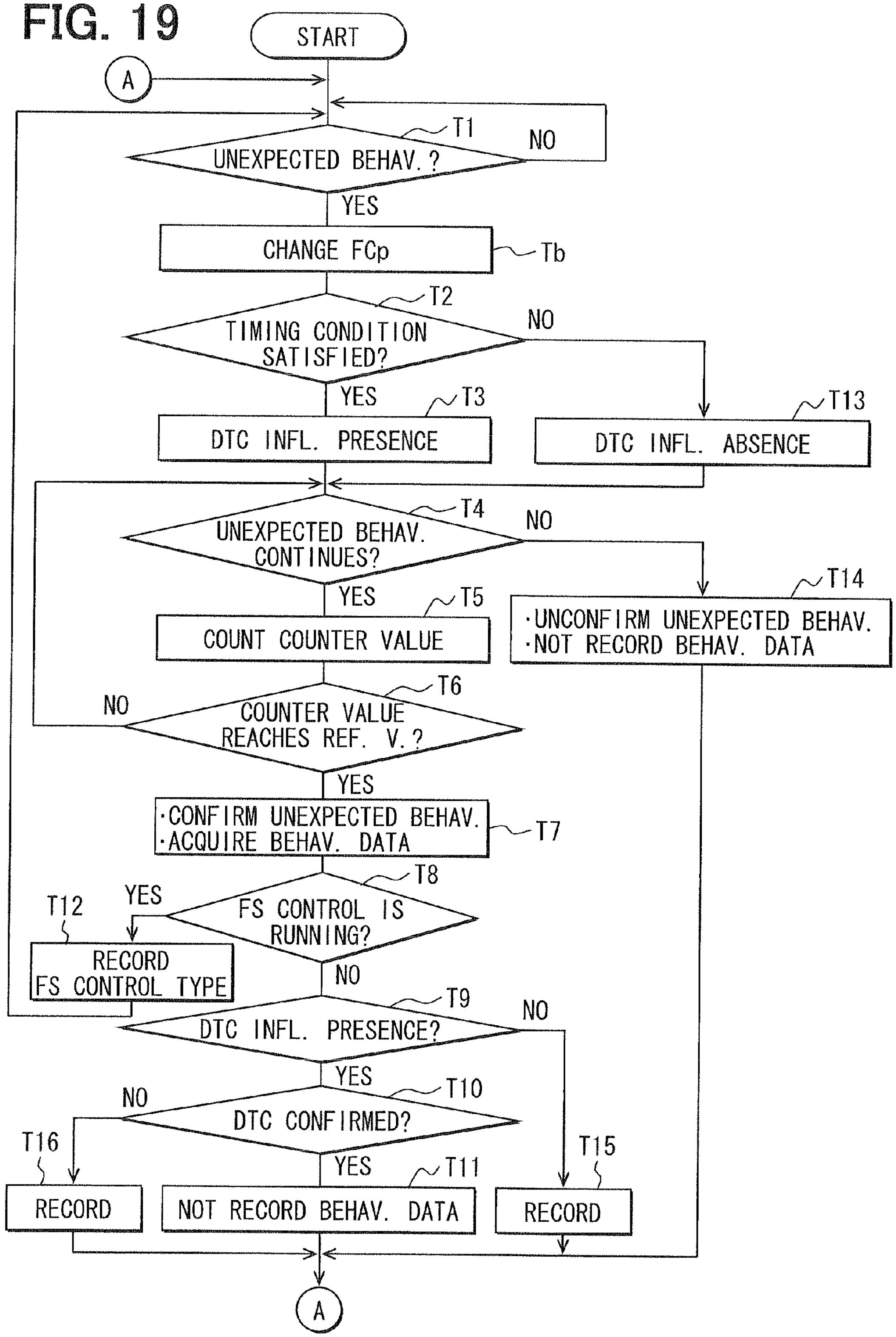
FIG. 19 is a flowchart illustrating operation of a recording apparatus of a third embodiment.

FIGS. 19 and 20 illustrate a third embodiment. FIG. 19 is a flowchart illustrating operation of the recording apparatus 3. The operation illustrated in FIG. 19 differs from that in FIG. 3 in that step Tb is added before T2. The present embodiment is made in consideration of the following. A period of time from when a DTC is detected to a time when an influence of the DTC on a driver's behavior emerges as an unexpected behavior varies depending on DTC types. For example, in a first DTC type, an influence of the DTC on a driver's behavior immediately emerges as an unexpected behavior. In a second DTC type, it takes a long time for an influence of the DTC on a driver's behavior to emerge as an unexpected behavior. Examples of the first DTC type include a disconnection fault or short-circuit fault of an electronic throttle position sensor, a disconnection fault of a revolution signal wire, and the like. In the first DTC type, it is predicted that the driver immediately responds and performs an unexpected behavior such as sudden acceleration operation for sudden acceleration, sudden brake pedal operation for sudden deceleration. Examples of the second DTC type include an engine misfire or an ABS abnormality. In the second DTC type, a time for the driver to respond to the DTC occurrence (e.g., sudden acceleration or deceleration) may be relatively long.

The third embodiment takes into account the above point. Specifically, in step Tb in FIG. 19, depending on DTC types, the prescribed value FCp, which is associated with the predetermined time condition, is changed. As shown in FIG. 20, in order to set the prescribed value FCp depending on DTC types, multiple DTC types are grouped into a first group, a second group, and a third group. The first group has DTCs to which the driver responds quickly. For DTCs in the second group, the driver's response time is normal (relative middle time). The third group is DTCs to which the driver responds late. For the DTC types belonging to the first group, the prescribed value FCp is changed to or set to, for example, 2%. For the DTC types belonging to the second group, the prescribed value FCp is set to, for example, 15%. For the DTC types belonging to the third group, the prescribed value FCp is set to, for example, 50%. The above values 2%, 15%, 50%, are merely examples, and further, the number of groups is not limited to three. For each DTC, the prescribed value FCp may be set.

According to the third embodiment, since the prescribed value FCp is changed according to DTC type, a determination as to whether or not the unexpected behavior comes from the DIG influence can be accurately and promptly made according to DTC type.

Fourth Embodiment

Figure 21:
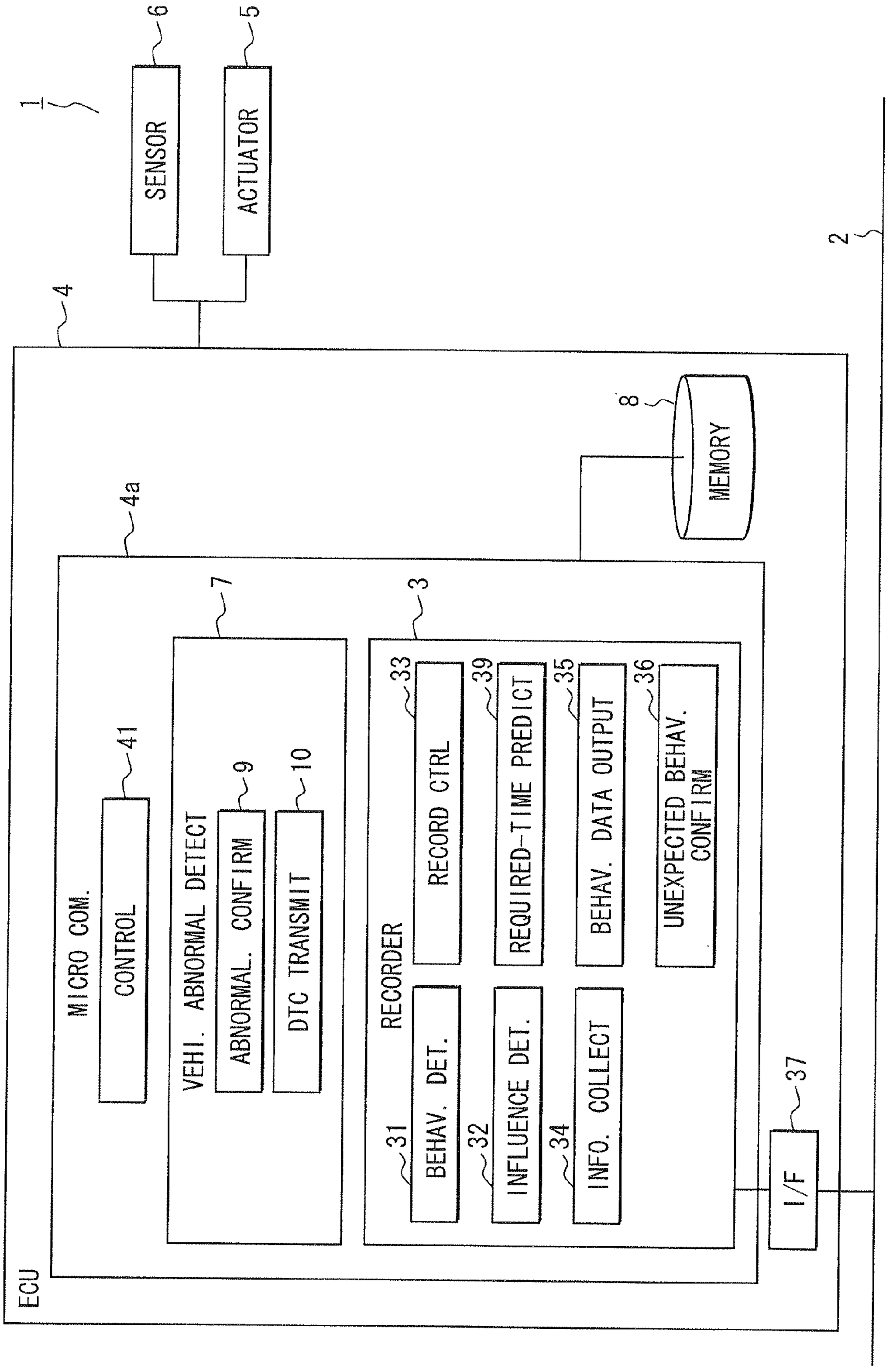
FIG. 21 is a functional block diagram illustrating a vehicle behavior data recording control system of a fourth embodiment.

FIG. 21 illustrates a fourth embodiment. In the fourth embodiment, the ECU 4 connected with the CAN bus 2 includes the recording apparatus 3. Thus, the ECU 4 can also play a role of the recording apparatus 3. In this case, the non-volatile memory 8 may also serve as the non-volatile memory 38 of the first embodiment. The non-volatile memory 8 may also used in the recording apparatus 3.

Other Embodiments

In the first embodiment, based on the time of occurrence of the unexpected behavior and the FC value at the time of acquisition of the vehicle abnormality information, it is determined whether or not the DTC influence is present. Alternatively, the vehicle abnormality information of the vehicle abnormality detection apparatus 7 and the behavior data acquired by the recording apparatus may include common time information. Additionally, in the vehicle abnormality information, the time information may be associated with the FC value. The vehicle abnormality influence determination section 32 of the recording apparatus 3 may detect the FC value from the time information of the vehicle abnormality information that matches the time information of the behavior data at the time the occurrence of the unexpected behavior determined by the behavior determination section 31.

According to this configuration, since the FC value is detected from the time information of the vehicle abnormality information that matches the time information of the behavior data at the time of determining the occurrence of the unexpected behavior, the FC value at the time of determining the occurrence of the unexpected behavior can be accurately detected.

In the above embodiments, the vehicle abnormality detection apparatus 7 is provided by a self-diagnosis function of an ECU. Alternatively, the vehicle abnormality detection apparatus 7 may be a dedicated apparatus that comprehensively detects vehicle abnormalities based on various data and information on the CAN bus 2.

After the DTC confirmation, the DTC confirmation information may be regularly transmitted to the CAN bus 2. A time stamp indicative of a time when the DTC confirmation is determined may be added to the DTC confirmation information. The DTC confirmation information including this time stamp may be periodically transmitted in step T5 of FIG. 2. Likewise, a time stamp indicative of a time when the DTC un-confirmation is determined may be added to the DTC un-confirmation information. The DTC un-confirmation information including this time stamp may be periodically transmitted in step T10 of FIG. 2. According to this configuration, even if a communication error causes failure of transmission and receipt of the DTC confirmation information or the DTC un-confirmation information transmitted in step T5 or step T10, the recording apparatus 3 can use the periodically-transmitted DTC confirmation information or DTC un-confirmation information to determine whether or not the unexpected behavior is attributed to the DTC.

The present disclosure has various aspects. For example, according to a first aspect, a vehicle behavior data recording control system is provided. The system comprises a recording apparatus and a vehicle abnormality detection apparatus connected with the recording apparatus via an in-vehicle network to enable data exchange with the recording apparatus. The vehicle abnormality detection apparatus detects a vehicle abnormality and transmits vehicle abnormality information to the in-vehicle network. The recording apparatus acquires the vehicle abnormality information from the vehicle abnormality detection apparatus via the in-vehicle network and acquires a vehicle behavior data via the in-vehicle network. The recording apparatus includes a memory, a behavior determination section, a vehicle abnormality influence determination section, and a record control section. The behavior determination section determines an occurrence of an unexpected behavior based on the acquired behavior data. In response to the occurrence of the unexpected behavior determined by the behavior determination section, the vehicle abnormality influence determination section determines whether or not a cause of the occurrence of the unexpected behavior is the vehicle abnormality. When a time of the occurrence of the unexpected behavior satisfies a predetermined timing condition with respect to a time of acquiring the vehicle abnormality information, the vehicle abnormality influence determination section determines that the cause of the occurrence of the unexpected behavior is the vehicle abnormality. When the time of the occurrence of the unexpected behavior fails to satisfy the predetermined timing condition with respect to the time of acquiring the vehicle abnormality information, the vehicle abnormality influence determination section determines that the cause of the occurrence of the unexpected behavior is not the vehicle abnormality. When the vehicle abnormality influence determination section determines that the cause of the occurrence of the unexpected behavior is the vehicle abnormality, the record control section is prohibited from recording the behavior data relating to the unexpected behavior in the memory. When the vehicle abnormality influence determination section determines that the cause of the occurrence of the unexpected behavior is not the vehicle abnormality, the record control section records the behavior data relating to the unexpected behavior in the memory as an unexpected behavior data.

The above vehicle behavior data recording control system is made in consideration of the following. When the vehicle abnormality occurs, a vehicle driver responding to this vehicle abnormality may perform an abnormal behavior. This abnormal behavior is not an unexpected behavior to be recorded. However, this abnormal behavior may satisfy a criterion and may be determined to be an unexpected behavior. In this case, after a recording apparatus acquires vehicle abnormality information, the recording apparatus determines occurrence of the unexpected behavior. Therefore, when a recording apparatus determines an occurrence of an unexpected behavior based on successively-acquired vehicle data, the recording apparatus can determines that a cause of the unexpected behavior is the vehicle abnormality, provided that a time of acquisition of the vehicle abnormality information is prior to a time of occurrence of the unexpected behavior. According to the above vehicle behavior data recording control system, when the vehicle abnormality influence determination section determines that the cause of the occurrence of the unexpected behavior is the vehicle abnormality, the record control section is prohibited from recording the behavior data relating to the unexpected behavior in the memory. Therefore, it is possible to improve determination accuracy as to whether or not a vehicle behavior is an unexpected behavior.

The above vehicle behavior data recording control system may be configured in the following way. The vehicle abnormality detection apparatus includes a vehicle abnormality confirmation section and a fail counter value transmission section. The vehicle abnormality confirmation section has a fail counter value, which is indicative of a phase of transition from the occurrence of the vehicle abnormality to confirmation of the vehicle abnormality. The vehicle abnormality confirmation section increases the fail counter value from an initial value if the vehicle abnormality continues. When the fail counter value reaches a prescribed value, the vehicle abnormality confirmation section (I) determines that the vehicle abnormality is confirmed, (ii) returns the fail counter value back to the initial value, and (iii) provides vehicle abnormality confirmation information. When the vehicle abnormality discontinues before the fail counter value reaches the prescribed value, the vehicle abnormality confirmation section (i) determines that the vehicle abnormality is not confirmed, (ii) returns the fail counter value back to the initial value, and (iii) provides vehicle abnormality un-confirmation information. The fail counter value transmission section transmits the vehicle abnormality information together with the fail counter value, the vehicle abnormality confirmation information and the vehicle abnormality un-confirmation information to the in-vehicle network. The predetermined timing condition for the vehicle abnormality influence determination section of the recording apparatus to determine that the cause of the occurrence of the unexpected behavior is the vehicle abnormality is that the fail counter value becomes equal to or greater than a prescribed value.

Incidentally, the vehicle abnormality detection apparatus may detect a vehicle abnormality that temporarily occurs due to some reasons (e.g., disturbance noise superimposed on a sensor signal) and may disappear soon. That is, the vehicle abnormality is unconfirmed. According to the above vehicle behavior data recording control system, since the vehicle abnormality detection apparatus determines vehicle abnormality confirmation and vehicle abnormality un-confirmation based on the fail counter value, the recording apparatus can handle a true vehicle abnormality. Furthermore, the fail coulter value indicates a temporal transition phase from the occurrence of the vehicle abnormality to the confirmation of the vehicle abnormality, specifically, the time of occurrence of the vehicle abnormality with respect to the time of occurrence of the unexpected behavior. Therefore, if the time of the occurrence of the unexpected behavior determined by the behavior determination section satisfies the predetermined timing condition (the time of the occurrence of the unexpected behavior is in a time range where the fail counter value is greater than or equal to the prescribed value), it is deemed that after the vehicle abnormality occurs, the unexpected behavior occurs. Therefore, based on the fail counter value, it can be determined whether or not the cause of the unexpected behavior is the influence of the vehicle abnormality. Determination processes can be simplified and speeded up.

The above vehicle behavior data recording control system may be configured in the following way. The recording apparatus further includes an unexpected behavior confirmation section. The unexpected behavior confirmation section determines that the unexpected behavior is confirmed, when the behavior determination section determines the occurrence of the unexpected behavior based on the acquired behavior data and thereafter the unexpected behavior continues to occur for a predetermined period of time. The unexpected behavior confirmation section determines that the unexpected behavior is not confirmed, when the behavior determination section determines the occurrence of the unexpected behavior based on the acquired behavior data and thereafter the unexpected behavior discontinues prior to elapse of the predetermined period of time. Even if the vehicle abnormality influence determination section determines that the cause of the occurrence of the unexpected behavior is the vehicle abnormality, the record control section records the behavior data as the unexpected behavior data as long as (i) the vehicle abnormality confirmation section determines that the vehicle abnormality is not confirmed and (ii) the unexpected behavior confirmation section determines that the occurrence of the unexpected behavior is confirmed. When the unexpected behavior confirmation section determines that the occurrence of the unexpected behavior is not confirmed, the record control section is prohibited, as an exceptional measure, from recording the behavior data regardless of a determination result of the vehicle abnormality influence determination section and a determination result of the vehicle abnormality confirmation section.

In some cases, if the unexpected behavior is confirmed upon first detection of an unexpected behavior, it would not matter. However, in other cases, a behavior data causing the detection of the unexpected behavior may be unstable or a noisy data. However, according to the above vehicle behavior data recording control system, the unexpected behavior confirmation section determines whether or not the unexpected behavior is confirmed. Even if the vehicle abnormality influence determination section determines that the cause of the occurrence of the unexpected behavior is the vehicle abnormality, the record control section records the behavior data as the unexpected behavior data as long as (i) the vehicle abnormality confirmation section determines that the vehicle abnormality is not confirmed and (ii) the unexpected behavior confirmation section determines that the occurrence of the unexpected behavior is confirmed. When the unexpected behavior confirmation section determines that the occurrence of the unexpected behavior is not confirmed, the record control section is prohibited, as an exceptional measure, from recording the behavior data regardless of a determination result of the vehicle abnormality influence determination section and a determination result of the vehicle abnormality confirmation section. Therefore, depending on the confirmation and un-confirmation of the unexpected behavior and the conformation and un-confirmation of the vehicle abnormality, the behavior data is recorded and is not recorded appropriately.

The above vehicle behavior data recording control system may be configured in the following way. The recording apparatus further includes a required time prediction section that predicts a required period of time from a first time point to a second time point based on a rate of change in the fail counter value. The first time point is a time at which the behavior determination section determines the occurrence of the unexpected behavior. The second time point is a time at which the vehicle abnormality confirmation section determines that the vehicle abnormality is confirmed. After elapse of the predicted required period of time, the record control section checks a determination result of the vehicle abnormality confirmation section. Because of the required time prediction section, when the abnormality behavior discontinues after occurrence of the unexpected behavior, in other words, when the fail counter value is reset after occurrence of the unexpected behavior, it can be determined that the cause of the unexpected behavior is not the vehicle abnormality.

The above vehicle behavior data recording control system may be configured in the following way. In recording the vehicle behavior, the record control section adjusts types of the unexpected behavior data to be recorded, such that: the types of the unexpected behavior data to be recorded are dependent on the fail coulter value at the time of the occurrence of the unexpected behavior determined by the vehicle abnormality determination section; and as the fail coulter value increases, the record control section decreases the types of the unexpected behavior data to be recorded.

When it is determined that an influence of a vehicle abnormality is absent, the influence of a vehicle abnormality may be truly absent if the fail counter value at the time of the occurrence of the unexpected behavior indicates no vehicle abnormality. In other cases, before the confirmation of the vehicle abnormality, if the fail counter value has a meaningful value, there is a possibility that the influence of a vehicle abnormality is not zero. In this case, as the fail counter value increases, a time interval between the vehicle abnormality detection and the unexpected behavior detection increases. The absence of the vehicle abnormality influence might not be right.

In this regard, according to the above vehicle behavior data recording control system, the number of types of unexpected behavior data to be recorded can be adjusted by the record control section based on how large the fail counter value at the time of determination of the unexpected behavior is. Thus, the types of behavior data to be recorded can be properly changed by taking into account a relation between the types of behavior data and the vehicle abnormalities.

The above vehicle behavior data recording control system may be configured in the following way. The vehicle abnormality information, which is provided by the vehicle abnormality detection apparatus, includes information indicating type of the vehicle abnormality. According to the type of the vehicle abnormality, the abnormality influence determination section of the recording apparatus changes the prescribed value, which relates to the predetermined timing condition, which is satisfied when the fail counter value reaches the prescribed value.

A period of time from detection of a vehicle amorality to a time when an influence of the vehicle abnormality on a driver's behavior emerges as an unexpected behavior varies depending on vehicle abnormality types. For example, in a first vehicle abnormality type, an influence of the vehicle abnormality on a driver's behavior immediately emerges as an unexpected behavior. In a second vehicle abnormality type, it takes a long time for an influence of the vehicle abnormality on a driver's behavior to emerge as an unexpected behavior. Examples of the first vehicle abnormality type include a disconnection fault or short-circuit fault of an electronic throttle position sensor, a disconnection fault of a revolution signal wire, and the like. In the first vehicle abnormality type, it is predicted that the driver immediately responds and performs an unexpected behavior such as sudden acceleration operation for sudden acceleration, sudden brake pedal operation for sudden deceleration. Examples of the second DTC type include an engine misfire or an ABS abnormality. In the second vehicle abnormality type, a time for the driver to respond to the vehicle abnormality (e.g., sudden acceleration or deceleration) may be relatively long. According to the above vehicle behavior data recording control system, since the prescribed value is changed according to type of the vehicle abnormality, the determination as to whether or not a cause of the unexpected behavior is the vehicle abnormality can be made with high accuracy, as compared with a case where the prescribed value is constant to provide a uniform determination timing.

The above vehicle behavior data recording control system may be configured in the following way. The vehicle abnormality information provided by the vehicle abnormality detection apparatus and the behavior data acquired by the recording apparatus include common time information. In the vehicle abnormality information, the time information is associated with the fail counter value. The vehicle abnormality influence determination section of the recording apparatus detects the fail counter value from the time information of the vehicle abnormality information that matches the time information of the behavior data at the time of the occurrence of the unexpected behavior determined by the behavior determination section.

According to the above configuration, since the fail counter value is detected from the time information of the vehicle abnormality information that matches the time information of the behavior data at the time of the occurrence of the unexpected behavior, the fail counter value at the time of the occurrence of the unexpected behavior can be accurately detected. A determination as to whether or not the unexpected behavior is attributed to the vehicle abnormality can be made with high accuracy.

The above vehicle behavior data recording control system may be configured in the following way. In addition to the vehicle abnormality information, the vehicle abnormality detection apparatus transmits fail-safe-running-information, which indicates that a fail-safe operation is running as vehicle-abnormality-follow-up operation, to the in-vehicle network. The record control section of the recording apparatus records type of the fail-safe operation when (i) the behavior determination section determines the occurrence of the unexpected behavior and (ii) the time of the occurrence of the unexpected behavior matches a time of acquisition of the fail-safe-running-information.

Depending on vehicle abnormality types, a fail safe operation is performed after vehicle abnormality detection. For example, a vehicle abnormality detection apparatus for an ABS may detect an ABS abnormality, confirms the abnormality, and thereafter prohibits the ABS from operating. It is conceivable that if it is determined that the unexpected behavior has occurred during this fail-safe operation, the unexpected behavior may come from the fail-safe operation following the vehicle abnormality. According to the above vehicle behavior data recording control system, the record control section of the recording apparatus records the type of the fail-safe operation when (i) the behavior determination section determines the occurrence of the unexpected behavior and (ii) the time of the occurrence of the unexpected behavior matches a time of acquisition of the fail-safe-running-information. Since the recording apparatus records not the behavior data but the type of the fail-safe operation as an exceptional measure, the type of the fail-safe operation that may be a cause of the unexpected behavior can be recorded.

In the vehicle behavior data recording control system, the vehicle abnormality detection apparatus and the recording apparatus may be incorporated into a single electronic control unit. According to this configuration, even if the in-vehicle network is unavailable, the above-described can be achieved.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle behavior data recording control system comprising:

a recording apparatus; and a vehicle abnormality detection apparatus connected with the recording apparatus via an in-vehicle network to enable data exchange with the recording apparatus, wherein:

the vehicle abnormality detection apparatus detects a vehicle abnormality and transmits vehicle abnormality information to the in-vehicle network, the recording apparatus acquires the vehicle abnormality information from the vehicle abnormality detection apparatus via the in-vehicle network and acquires a vehicle behavior data via the in-vehicle network, the vehicle abnormality detection apparatus is equipped with a storage unit, when the vehicle abnormality detection apparatus detects and confirms the vehicle abnormality, the vehicle abnormality detection apparatus records the vehicle behavior data at a time of the vehicle abnormality as a diagnosis information in the storage unit, the recording apparatus includes:

a memory;

a behavior determination section that determines an occurrence of an unexpected behavior based on the acquired vehicle behavior data;

a vehicle abnormality influence determination section that in response to the occurrence of the unexpected behavior determined by the behavior determination section, determines whether or not a cause of the occurrence of the unexpected behavior is the vehicle abnormality, determines that the cause of the occurrence of the unexpected behavior is the vehicle abnormality, when a time of the occurrence of the unexpected behavior satisfies a predetermined timing condition with respect to a time of acquiring the vehicle abnormality information, and determines that the cause of the occurrence of the unexpected behavior is not the vehicle abnormality, when the time of the occurrence of the unexpected behavior fails to satisfy the predetermined timing condition with respect to the time of acquiring the vehicle abnormality information; and a record control section that is prohibited from recording the vehicle behavior data relating to the unexpected behavior in the memory, when the vehicle abnormality influence determination section determines that (i) the time of the occurrence of the unexpected behavior satisfies the predetermined timing condition with respect to the time of acquiring the vehicle abnormality information and (ii) the cause of the occurrence of the unexpected behavior is the vehicle abnormality, so that the vehicle behavior data at time of the vehicle abnormality, which is stored in the storage unit as the diagnosis information, is prohibited from being stored in the memory and records the vehicle behavior data relating to the unexpected behavior in the memory as an unexpected behavior data when the vehicle abnormality influence determination section determines that (i) the time of the occurrence of the unexpected behavior fails to satisfy the predetermined timing condition with respect to the time of acquiring the vehicle abnormality information and (ii) the cause of the occurrence of the unexpected behavior is not the vehicle abnormality.

2. The vehicle behavior data recording control system according to claim 1, wherein:

the vehicle abnormality detection apparatus includes a vehicle abnormality confirmation section and a fail counter value transmission section;

the vehicle abnormality confirmation section has a fail counter value, which is indicative of a phase of transition from the occurrence of the vehicle abnormality to confirmation of the vehicle abnormality;

the vehicle abnormality confirmation section increases the fail counter value from an initial value while the vehicle abnormality continues;

when the fail counter value reaches a prescribed value, the vehicle abnormality confirmation section (i) determines that the vehicle abnormality is confirmed, (ii) returns the fail counter value back to the initial value, and (iiI) provides vehicle abnormality confirmation information;

when the vehicle abnormality discontinues before the fail counter value reaches the prescribed value, the vehicle abnormality confirmation section (i) determines that the vehicle abnormality is not confirmed, (ii) returns the fail counter value back to the initial value, and (iii) provides vehicle abnormality un-confirmation information;

the fail counter value transmission section transmits the vehicle abnormality information together with the fail counter value, the vehicle abnormality confirmation information and the vehicle abnormality un-confirmation information to the in-vehicle network; and the predetermined timing condition for the vehicle abnormality influence determination section of the recording apparatus to determine that the cause of the occurrence of the unexpected behavior is the vehicle abnormality is that the fail counter value becomes equal to or greater than a prescribed value.

3. The vehicle behavior data recording control system according to claim 2, wherein:

the recording apparatus further includes an unexpected behavior confirmation section;

the unexpected behavior confirmation section determines that the unexpected behavior is confirmed, when the behavior determination section determines the occurrence of the unexpected behavior based on the acquired behavior data and thereafter the unexpected behavior continues to occur for a predetermined period of time;

the unexpected behavior confirmation section determines that the unexpected behavior is not confirmed, when the behavior determination section determines the occurrence of the unexpected behavior based on the acquired behavior data and thereafter the unexpected behavior discontinues prior to elapse of the predetermined period of time;

even if the vehicle abnormality influence determination section determines that the cause of the occurrence of the unexpected behavior is the vehicle abnormality, the record control section records the behavior data as the unexpected behavior data as long as (i) the vehicle abnormality confirmation section determines that the vehicle abnormality is not confirmed and (ii) the unexpected behavior confirmation section determines that the occurrence of the unexpected behavior is confirmed; and when the unexpected behavior confirmation section determines that the occurrence of the unexpected behavior is not confirmed, the record control section is prohibited, as an exceptional measure, from recording the behavior data regardless of a determination result of the vehicle abnormality influence determination section and a determination result of the vehicle abnormality confirmation section.

4. The vehicle behavior data recording control system according to claim 2, wherein:

the recording apparatus further includes a required time prediction section that predicts a required period of time from a first time point to a second time point based on a rate of change in the fail counter value;

the first time point is a time at which the behavior determination section determines the occurrence of the unexpected behavior;

the second time point is a time at which the vehicle abnormality confirmation section determines that the vehicle abnormality is confirmed; and after elapse of the predicted required period of time, the record control section checks a determination result of the vehicle abnormality confirmation section.

5. The vehicle behavior data recording control system according to claim 2, wherein:

in recording the vehicle behavior, the record control section adjusts types of the unexpected behavior data to be recorded, such that the types of the unexpected behavior data to be recorded are dependent on the fail counter value at the time of the occurrence of the unexpected behavior determined by the vehicle abnormality determination section, and as the fail counter value increases, the record control section decreases the types of the unexpected behavior data to be recorded.

6. The vehicle behavior data recording control system according to claim 2, wherein:

the vehicle abnormality information, which is provided by the vehicle abnormality detection apparatus, includes information indicating type of the vehicle abnormality; and according to the type of the vehicle abnormality, the abnormality influence determination section of the recording apparatus changes the prescribed value, which relates to the predetermined timing condition, which is satisfied when the fail counter value reaches the prescribed value.

7. The vehicle behavior data recording control system according to claim 2, wherein:

the vehicle abnormality information provided by the vehicle abnormality detection apparatus and the behavior data acquired by the recording apparatus include common time information;

in the vehicle abnormality information, the time information is associated with the fail counter value; and the vehicle abnormality influence determination section of the recording apparatus detects the fail counter value from the time information of the vehicle abnormality information that matches the time information of the behavior data at the time of the occurrence of the unexpected behavior determined by the behavior determination section.

8. The vehicle behavior data recording control system according to claim 2, wherein:

in addition to the vehicle abnormality information, the vehicle abnormality detection apparatus transmits fail-safe-running-information, which indicates that a fail-safe operation is running as vehicle-abnormality-follow-up operation, to the in-vehicle network; and the record control section of the recording apparatus records type of the fail-safe operation when the behavior determination section determines the occurrence of the unexpected behavior and the time of the occurrence of the unexpected behavior matches a time of acquisition of the fail-safe-running-information.

9. The vehicle behavior data recording control system according to claim 1, wherein:

the vehicle abnormality detection apparatus and the recording apparatus are incorporated into a single electronic control unit.

10. A recording apparatus configured to acquire vehicle abnormality information indicative of a vehicle abnormality from a vehicle abnormality detection apparatus via an in-vehicle network and acquire a vehicle behavior data via the in-vehicle network, wherein the vehicle abnormality detection apparatus is equipped with a storage unit, wherein when the vehicle abnormality detection apparatus detects and confirms the vehicle abnormality, the vehicle abnormality detection apparatus records the vehicle behavior data at a time of the vehicle abnormality as a diagnosis information in the storage unit, the recording apparatus comprising:

a memory;

a behavior determination section that determines an occurrence of an unexpected behavior based on the acquired vehicle behavior data;

a vehicle abnormality influence determination section that in response to the occurrence of the unexpected behavior determined by the behavior determination section, determines whether or not a cause of the occurrence of the unexpected behavior is the vehicle abnormality, determines that the cause of the occurrence of the unexpected behavior is the vehicle abnormality, when a time of the occurrence of the unexpected behavior satisfies a predetermined timing condition with respect to a time of acquiring the vehicle abnormality information, and determines that the cause of the occurrence of the unexpected behavior is not the vehicle abnormality, when the time of the occurrence of the unexpected behavior fails to satisfy the predetermined timing condition with respect to the time of acquiring the vehicle abnormality information; and a record control section that is prohibited from recording the vehicle behavior data relating to the unexpected behavior in the memory when the vehicle abnormality influence determination section determines that (i) the time of the occurrence of the unexpected behavior satisfies the predetermined timing condition with respect to the time of acquiring the vehicle abnormality information and (ii) the cause of the occurrence of the unexpected behavior is the vehicle abnormality, so that the vehicle behavior data at the time of the vehicle abnormality, which is stored in the storage unit as the diagnosis information, is prohibited from being stored in the memory and records the vehicle behavior data relating to the unexpected behavior in the memory as an unexpected behavior data when the vehicle abnormality influence determination section determines that (i) the time of the occurrence of the unexpected behavior fails to satisfy the predetermined timing condition with respect to the time of acquiring the vehicle abnormality information and (ii) the cause of the occurrence of the unexpected behavior is not the vehicle abnormality.

11. The recording apparatus according to claim 10, wherein:

the vehicle abnormality confirmation section has a fail counter value, which is indicative of a phase of transition from the occurrence of the vehicle abnormality to confirmation of the vehicle abnormality; and the predetermined timing condition for the vehicle abnormality influence determination section to determine that the cause of the occurrence of the unexpected behavior is the vehicle abnormality is that the fail counter value becomes equal to or greater than a prescribed value.

12. The recording apparatus according to claim 11, further comprising:

an unexpected behavior confirmation section, wherein:

the unexpected behavior confirmation section determines that the unexpected behavior is confirmed, when the behavior determination section determines the occurrence of the unexpected behavior based on the acquired behavior data and thereafter the unexpected behavior continues to occur for a predetermined period of time;

the unexpected behavior confirmation section determines that the unexpected behavior is not confirmed, when the behavior determination section determines the occurrence of the unexpected behavior based on the acquired behavior data and thereafter the unexpected behavior discontinues prior to elapse of the predetermined period of time;

even if the vehicle abnormality influence determination section determines that the cause of the occurrence of the unexpected behavior is the vehicle abnormality, the record control section records the behavior data as the unexpected behavior data as long as (i) the vehicle abnormality confirmation section determines that the vehicle abnormality is not confirmed and (ii) the unexpected behavior confirmation section determines that the occurrence of the unexpected behavior is confirmed; and when the unexpected behavior confirmation section determines that the occurrence of the unexpected behavior is not confirmed, the record control section is prohibited, as an exceptional measure, from recording the behavior data regardless of a determination result of the vehicle abnormality influence determination section and a determination result of the vehicle abnormality confirmation section.

13. The recording apparatus according to claim 11, further comprising:

a required time prediction section that predicts a required period of time from a first time point to a second time point based on a rate of change in the fail counter value, wherein:

the first time point is a time at which the behavior determination section determines the occurrence of the unexpected behavior;

the second time point is a time at which the vehicle abnormality confirmation section determines that the vehicle abnormality is confirmed; and after elapse of the predicted required period of time, the record control section checks a determination result of the vehicle abnormality confirmation section.

14. The recording apparatus according to claim 11, wherein:

in recording the vehicle behavior, the record control section adjusts types of the unexpected behavior data to be recorded, such that the types of the unexpected behavior data to be recorded are dependent on the fail counter value at the time of the occurrence of the unexpected behavior determined by the vehicle abnormality determination section, and as the fail counter value increases, the record control section decreases the types of the unexpected behavior data to be recorded.

15. The recording apparatus according to claim 11, wherein:

the vehicle abnormality information includes information indicating type of the vehicle abnormality; and according to the type of the vehicle abnormality, the abnormality influence determination section changes the prescribed value, which relates to the predetermined timing condition, which is satisfied when the fail counter value reaches the prescribed value.

16. The recording apparatus according to claim 11, wherein:

the vehicle abnormality information and the acquired behavior data include common time information;

in the vehicle abnormality information, the time information is associated with the fail counter value; and the vehicle abnormality influence determination section detects the fail counter value from the time information of the vehicle abnormality information that matches the time information of the behavior data at the time of the occurrence of the unexpected behavior determined by the behavior determination section.

17. The recording apparatus according to claim 11, wherein:

in addition to the vehicle abnormality information, the recording apparatus acquires fail-safe-running-information, which indicates that a fail-safe operation is running as vehicle-abnormality-follow-up operation; and the record control section records type of the fail-safe operation when the behavior determination section determines the occurrence of the unexpected behavior and the time of the occurrence of the unexpected behavior matches a time of acquisition of the fail-safe-running-information.

18. The recording apparatus according to claim 10, wherein the recording apparatus has a vehicle abnormality detection function to detect the vehicle abnormality.

* * * * *